United States Patent
Sparks et al.

(10) Patent No.: US 9,757,902 B2
(45) Date of Patent: Sep. 12, 2017

(54) ADDITIVE LAYERING METHOD USING IMPROVED BUILD DESCRIPTION

(71) Applicant: Product Innovation and Engineering L.L.C., Saint James, MO (US)

(72) Inventors: Todd Eugene Sparks, Rolla, MO (US); Kenneth K. Fletcher, Rolla, MO (US)

(73) Assignee: Product Innovation and Engineering L.L.C., Rolla, MO (US)

(*) Notice: Subject to any disclaimer, the term of this patent is extended or adjusted under 35 U.S.C. 154(b) by 365 days.

(21) Appl. No.: 14/643,812

(22) Filed: Mar. 10, 2015

(65) Prior Publication Data

US 2016/0059493 A1    Mar. 3, 2016

Related U.S. Application Data

(63) Continuation-in-part of application No. 14/474,993, filed on Sep. 2, 2014, now Pat. No. 9,573,224.

(51) Int. Cl.
*B23K 26/34* (2014.01)
*B29C 67/00* (2017.01)
(Continued)

(52) U.S. Cl.
CPC ...... *B29C 67/0088* (2013.01); *G05B 19/4099* (2013.01); *B33Y 50/02* (2014.12);
(Continued)

(58) Field of Classification Search
CPC B23K 26/034; B23K 26/0626; B23K 26/345; B23K 26/342; B23K 15/0086;
(Continued)

(56) References Cited

U.S. PATENT DOCUMENTS 4,817,020 A    3/1989    Chande
4,959,244 A    9/1990    Penny
(Continued)

FOREIGN PATENT DOCUMENTS

DE    4234339    6/2002
DE    102010015023    10/2011
(Continued)

OTHER PUBLICATIONS

Office Action dated Aug. 12, 2016 cited in co-pending U.S. Appl. No. 14/558,306.

(Continued)

*Primary Examiner* — Brian Jennison
(74) *Attorney, Agent, or Firm* — Don V. Kelly; Evans & Dixon, L.L.C.

(57) ABSTRACT

A build description is created for a part intended to be built by additive layering. The build description includes a description of the part broken down into constituent substructures and a build sequence for the substructures. A power schedule calculation method utilizes the build description and an idealized geometry to predict laser power levels on an additive path during laser deposition. The method calculates beam power for any point along the path traveled to form the build. Each point along the path has associated with it an idealized geometry comprising a melt pool, hot zone and bulk portion. The method comprises creating the build description, creating a path description representing the path of the beam source through space during the process, calculating the idealized geometry for the point on the path based upon the geometric description and path description, calculating an energy balance at the melt pool for the point on the path, calculating total energy needed at the point on the path and calculating optimum beam source power. In the calculations, build temperature is (Continued)

based upon a calculation of hot zone temperature derived from the idealized geometry.

4 Claims, 31 Drawing Sheets
(1 of 31 Drawing Sheet(s) Filed in Color)

(51) Int. Cl.
  *G05B 19/4099*  (2006.01)
  *B33Y 50/02*  (2015.01)
(52) U.S. Cl.
  CPC .............. *G05B 2219/35134* (2013.01); *G05B 2219/49007* (2013.01); *Y02P 90/265* (2015.11)
(58) Field of Classification Search
  CPC ......... B33Y 10/00; B33Y 50/00; B33Y 50/02; G06F 19/00
  See application file for complete search history.

(56) References Cited

U.S. PATENT DOCUMENTS

| | | | |
|---|---|---|---|
| 5,155,329 | A | 10/1992 | Terada |
| 5,247,155 | A | 9/1993 | Steen |
| 5,283,416 | A | 2/1994 | Shirk |
| 5,334,191 | A | 8/1994 | Poppa |
| 5,449,882 | A | 9/1995 | Black |
| 5,517,420 | A | 5/1996 | Kinsman |
| 5,651,903 | A | 7/1997 | Shirk |
| 5,674,415 | A | 10/1997 | Leong |
| 5,854,751 | A | 12/1998 | DiPietro |
| 6,122,564 | A | 9/2000 | Koch |
| 6,188,041 | B1 | 2/2001 | Kim |
| 6,311,099 | B1 | 10/2001 | Jasper |
| 6,780,657 | B2 | 8/2004 | Ino |
| 6,809,820 | B2 | 10/2004 | Snelling |
| 6,813,533 | B1 | 11/2004 | Semak |
| 6,995,334 | B1 | 2/2006 | Kovacevic |
| 7,186,947 | B2 | 3/2007 | Connally |
| 8,426,770 | B2 | 4/2013 | Pinon |
| 8,777,482 | B2 | 7/2014 | Pfitzner |
| 2006/0032840 | A1 | 2/2006 | Bagavath-Singh |
| 2006/0249487 | A1 | 11/2006 | Dunias |
| 2007/0179484 | A1 | 8/2007 | Sade |
| 2008/0029495 | A1 | 2/2008 | Emiljanow |
| 2008/0296270 | A1 | 12/2008 | Song |
| 2009/0206065 | A1 | 8/2009 | Kruth |
| 2009/0255980 | A1 | 10/2009 | Li |
| 2009/0283501 | A1 | 11/2009 | Erikson |
| 2010/0134628 | A1 | 6/2010 | Pfitzner |
| 2011/0100964 | A1 | 5/2011 | Burbaum |
| 2013/0062324 | A1 | 3/2013 | Dorsch |
| 2013/0066403 | A1 | 3/2013 | Giraud |
| 2013/0168902 | A1 | 7/2013 | Herzog |
| 2013/0319580 | A1 | 12/2013 | Ozbaysal |
| 2015/0268099 | A1 | 9/2015 | Craig |

FOREIGN PATENT DOCUMENTS

| | | |
|---|---|---|
| DE | 102010039442 | 2/2012 |
| EP | 1340583 | 3/2003 |
| EP | 1958584 | 8/2008 |
| EP | 1099184 | 1/2014 |
| EP | 1693141 | 2/2014 |
| WO | WO 00/76715 | 12/2000 |

OTHER PUBLICATIONS

B. Dutta, Rapid manufacturing and remanufacturing of DoD components using direct metal deposition, Published in: The AMMTIAC Quarterly, vol. 6, No. 2, p. 5.

S. Cohen, A model for the reflectivity in laser-substrate interactions, Source: Journal of Applied Physics, v 64, n 10, pt. 1, 5102-5, Nov. 15, 1988; Country of publication: USA.

Z. Ye, Real-time measure system of molten pool temperature field in laser remanufacturing, Published in: Lasers & Electro Optics & The Pacific Rim Conference on Lasers and Electro-Optics, 2009. CLEO/Pacific Rim '09. Conference on Date of Conference: Aug. 30-3, 2009pp. 1-2E.

R. Fabbro, Study of keyhole geometry for full penetration Nd-Yag CW laser welding, Published in: Lasers and Electro-Optics Europe, 2005. CLEO/Europe. 2005 Conference on Date of Conference: Jun. 17-17, 2005 p. 659.

Govardhan, S.M, Real-time welding process control using infrared sensing. Thermal, Mechanical and Multi-Physics Simulation and Experiments in Microelectronics and Microsystems (EuroSimE), 2013 14th International Conference on Apr. 14-17, 2013 pp. 1-5.

Toshinari, O., Measurement of TIG weld pool surface temperature distribution by UV radiation thermometry, Published in: SICE 2002. Proceedings of the 41st SICE Annual Conference (vol. 1)Date of Conference: Aug. 5-7, 2002 pp. 39-41 vol. 1.

Dutta, B., Additive manufacturing by direct metal deposition, Published in: Advanced Materials & Processes, Date: May 2011.

Heralic, Monitoring and Control of Robotized Laser Metal-Wire Deposition, Department of Engineering Science University West, Trollhattan, Sweden, 2012.

Craeghs, Online Quality Control of Selective Laser Melting, Katholieke Universiteit Lueven, Department of Mechanical Engineering, Celestijnenlaan 300B, 3001 Haverlee (Belgium) 2011.

Barua, Development of a Low Cost Imaging System for a Laser Metal Deposition Process, Department of Manufacturing Engineering, Missouri University of Science and Technology.

ADDITIVE LAYERING METHOD USING IMPROVED BUILD DESCRIPTION

CROSS REFERENCE TO RELATED APPLICATION

This application is a continuation-in-part of U.S. patent application Ser. No. 14/474,993 entitled "System and Method for Determining Beam Power Level Along an Additive Deposition Path." The full contents of that application are herein incorporated by reference.

STATEMENT REGARDING FEDERALLY SPONSORED RESEARCH OR DEVELOPMENT

Not applicable.

SEQUENCE LISTING, TABLE OR COMPUTER PROGRAM ON COMPACT DISC

Not applicable.

FIELD OF INVENTION

This invention relates generally to additive layering techniques, particularly those using an emitted energy source such as in additive metal layering.

BACKGROUND OF THE INVENTION

Additive metal deposition is an industrial technique that builds fully-dense structures by melting powdered or wire metal, via a laser or other energy source, into solidifying beads, which are deposited side by side and layer upon layer upon a workpiece substrate. It is known to utilize the process to repair and rebuild a worn or damaged component using a laser to build up structure on the component. The process is particularly useful to add features such as bosses or flanges on subcomponents of fabricated structures. The basic process involves adding layers to the component to create a surface feature on the component via the introduction of depositing material (delivered in the form of injected powder or a wire) into a laser beam. The additive process is known by several names including "laser cladding," "laser metal deposition," "direct metal deposition" or "additive metal layering."

Additive metal layering is typically performed by using a computer aided design ("CAD") to map the geometry of a part (known as a "build") and then depositing metal, layer-by-layer, on the part. The CAD mapped geometry is input into a computer controlled (robotic) part handler that can manipulate the part in multiple axes of movement during the deposition process. In all of these techniques a heat source (typically an industrial laser beam) is used to create a melt pool into which a wire or powdered feedstock is fed in order to create beads upon solidification. In practice, the heat source is under computer numerical control and is focused onto a workpiece, producing the melt pool. A small amount of powder or wire metal is introduced into the melt pool, building up the part in a thin layer. The beam follows a previously determined toolpath. The toolpath is generated based on the CAD data that computes the needed build layer by layer. The beads are created by means of relative motion of the melt pool and the substrate, e.g. using an industrial robot arm or an XY-table. A part is then built by depositing the beads side by side and layer upon layer. The most popular approach combines a high-power laser heat source with metal powder as the additive material.

Careful tuning of the deposition tool and parameters, such as the powder or wire feed rate, the energy input, and the traverse speed are therefore important in order to obtain layers, which are free from defects such as shape irregularities, lack-of-fusion or cracks. Droplet forming, i.e. globular transfer of the molten metal, is also a common disturbance that affects the geometrical profile of the deposited beads and stability of the additive layers.

Creating an accurate geometric description of, and tool path for, the build to be fabricated is critical to system operation and achieving a high-quality layered end product. The currently known laser additive processes attempt to generate a geometric description using a homogeneous, full geometry representation of the part to program the in-process tool path. This current method is depicted in FIGS. 1A-1E. In FIGS. 1A-1E the build direction is represented by the arrow adjacent to the representative structure, which resembles a tuning fork in shape. In FIG. 1A a CAD model or a part 70 is developed. Then, in FIG. 1B the tool path software generates a slice section 71 of the CAD model representing a section that will be built according to the planned build direction. After the build section is generated, an algorithm creates a tool path 72 indicating the path of travel of the layering apparatus during the prospective deposition process. This is shown in FIG. 1C. Using the calculated tool path, the system can calculate laser power needed along the path (laser power schedule 73) as shown in FIG. 1D.

Using the current processes for generating a geometric description, the build process runs into a problem. This is shown in FIG. 1E. In this respect, during the build process the deposition apparatus encounters regions (points "X") where the part is unsupported. To overcome this problem, existing additive process planners for three-axis processes require support structures for any unsupported geometry. These support structures must be made of a material than can survive the processing environment and is compatible with the build material. Typically this means that the support will be made of the same material as the part. The support structure solution adds cost due an increased volume of deposition and to increased machining necessary to remove the support. The desire to avoid machining large volumes of material is generally a major factor in choosing to produce a component by additive means. Hence, using a support structure is an undesirable characteristic of an additive process plan.

SUMMARY OF THE INVENTION

The present invention addresses the deficits of the prior art by providing for a method of generating a geometric description of a part along with a build sequence for use in an additive layer process that creates the part. The method involves decomposing the overall geometry of the part into substructures that can be sequentially additively manufactured. FIGS. 2A-2B depict a simplified summary of the process. As shown in FIG. 2A, once the CAD model of the overall part 70 is developed, the CAD model is subjected to a decomposition step by which the CAD model is divided into a set of sub-models 80a, 80b, 80c, 80d, 80e each representing a substructure of the part that will be buildable using only the build or original substrate as support. As shown in FIG. 2B, a build sequence is determined for each substructure which will result in building the overall part 70. By decomposing the part into substructures and then creating a substructure build sequence (arrows with ordinal numbers), the part can be additively manufactured without using a support structure.

The present invention thus enhances the additive manufacturing process by incorporating the ability to pre-process overall part geometry into manufacturable pieces by a purely topological approach, and unlike the prior art does not strictly rely on drawing standards or modeling feature information to dictate the tool path. The decomposition technique is adaptable to individual manufacturing methods as it arises from formalizing via heuristics and mathematics how a process expert would choose to decompose a component for additive manufacturing.

The inventive decomposition method is integrated into an additive layering method and system. It has particular useful application in an additive layering method and system utilizing a power prediction method that calculates optimum beam power for any point P(s) along the additive path, particularly the method disclosed herein that utilizes a calculated idealized geometry for each point P(s) along the additive path and wherein the idealized geometry for each point P(s) comprises a melt pool, hot zone and bulk portion.

BRIEF DESCRIPTION OF THE DRAWINGS

The patent or application file contains at least one drawing executed in color. Copies of this patent of patent application publication with color drawings(s) will be provided by the Office upon request and payment of the necessary fee.

DETAILED DESCRIPTION

In one embodiment of the present invention an additive layering process for building a part having an overall geometry by way of an additive layering process includes creating a build description (refined geometric description and build sequence) for the part according to the decomposition process described below. After the part has been decomposed into substructures that can be sequentially built and the build sequence created, the part is built by additive layering by building each substructure of the part in accordance with the build sequence, which may typically be the same sequence by which the part was virtually decomposed.

Figure 1A:
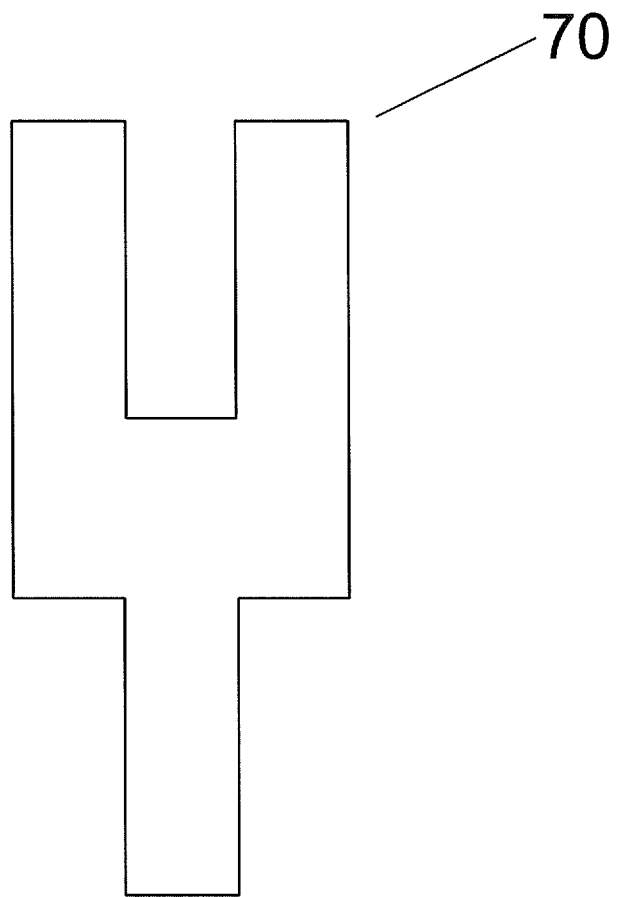
FIGS. 1A-1E depict the current method of creating a geometric description of a part formed by additive layering and a sequence for forming the part.
Figure 1B:
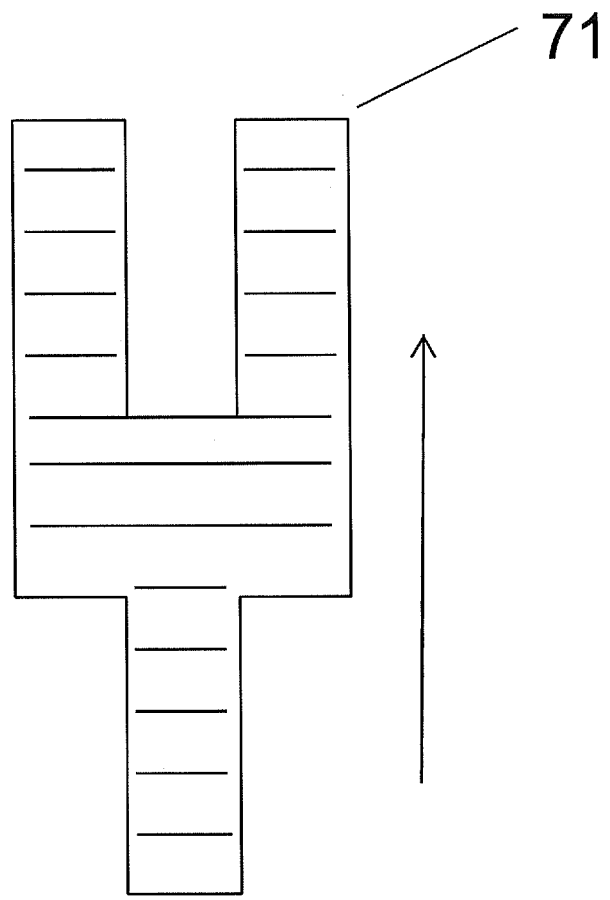
Figure 1C:
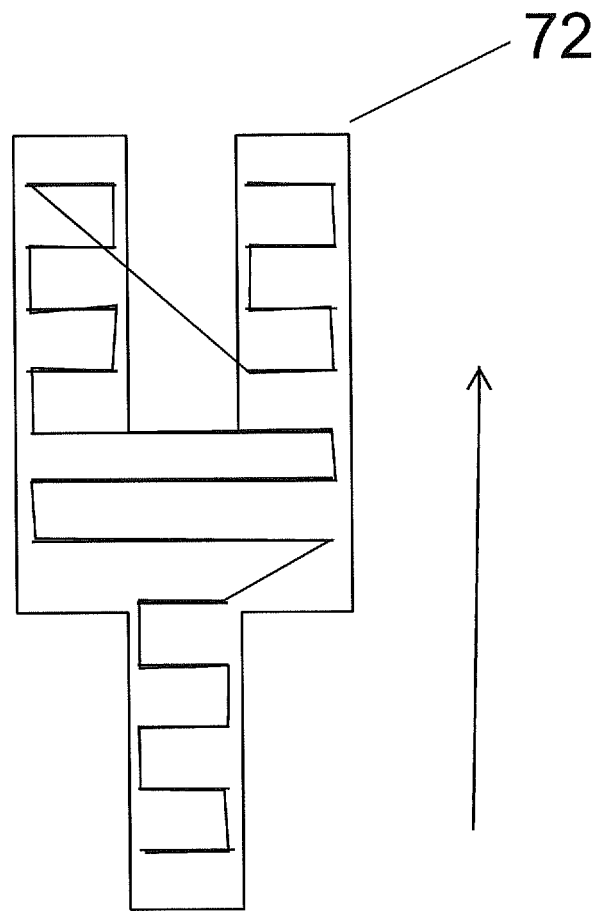
Figure 1D:
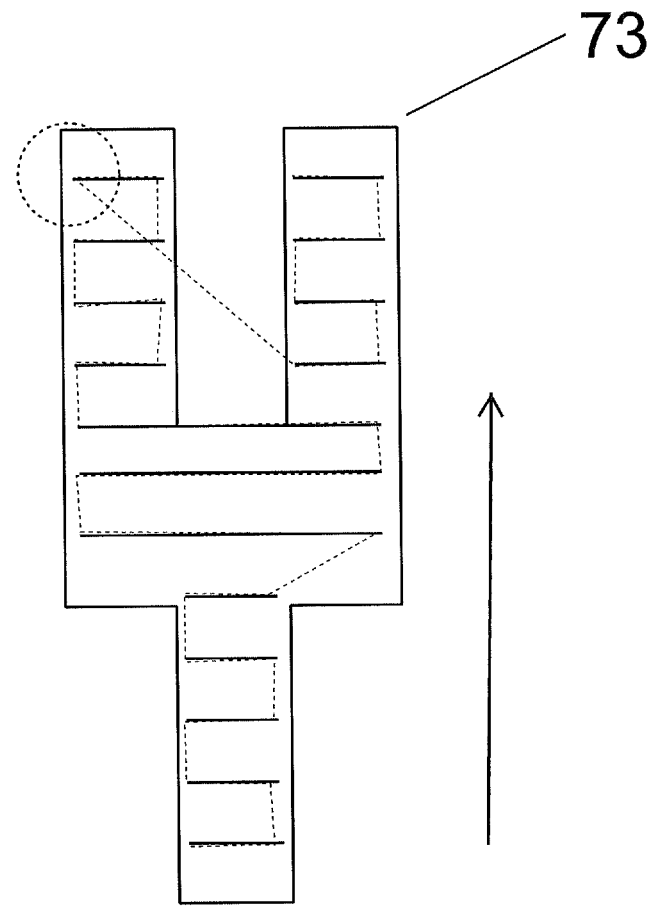
Figure 1E:
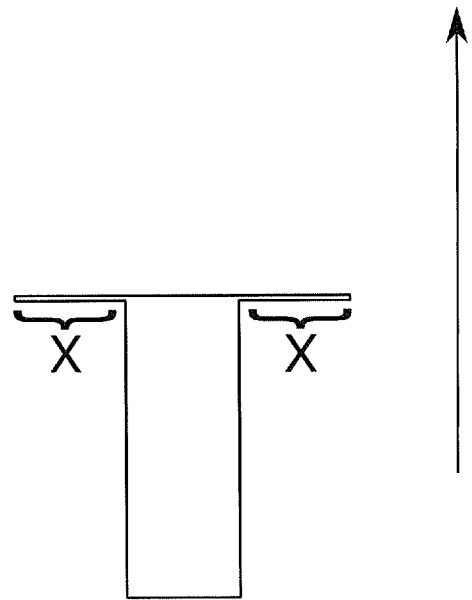
Figure 2A:
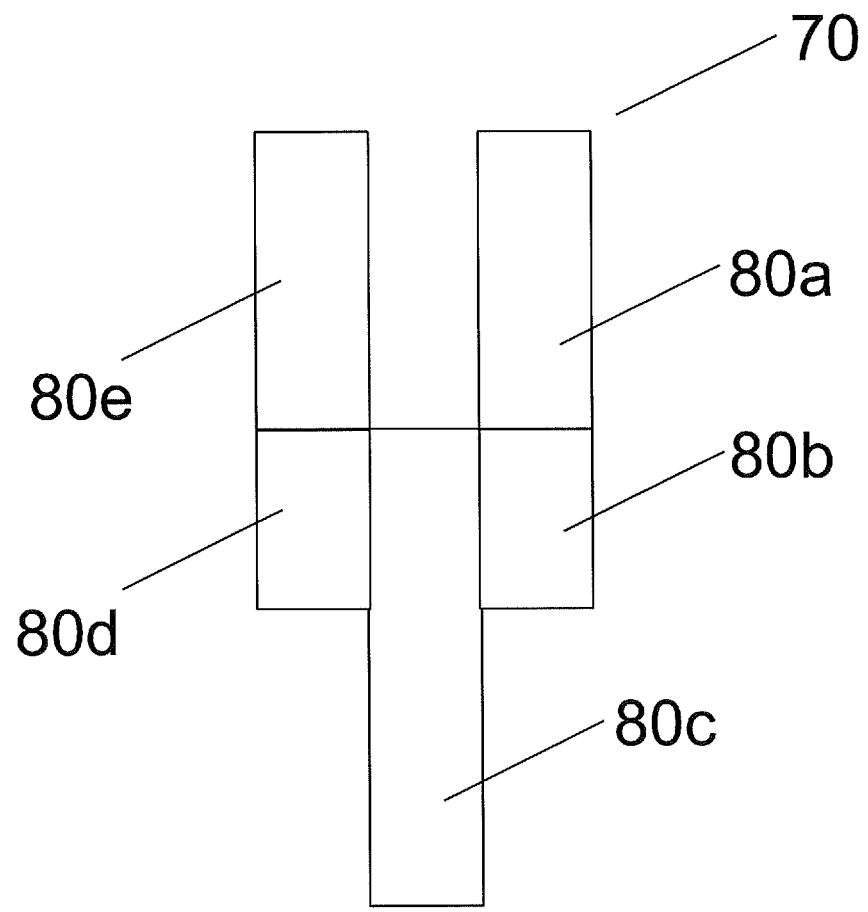
FIGS. 2A-B show a simplified graphical representation of an embodiment of the present invention method of creating a geometric description of a part formed by additive layering and a sequence for forming the part.
Figure 2B:
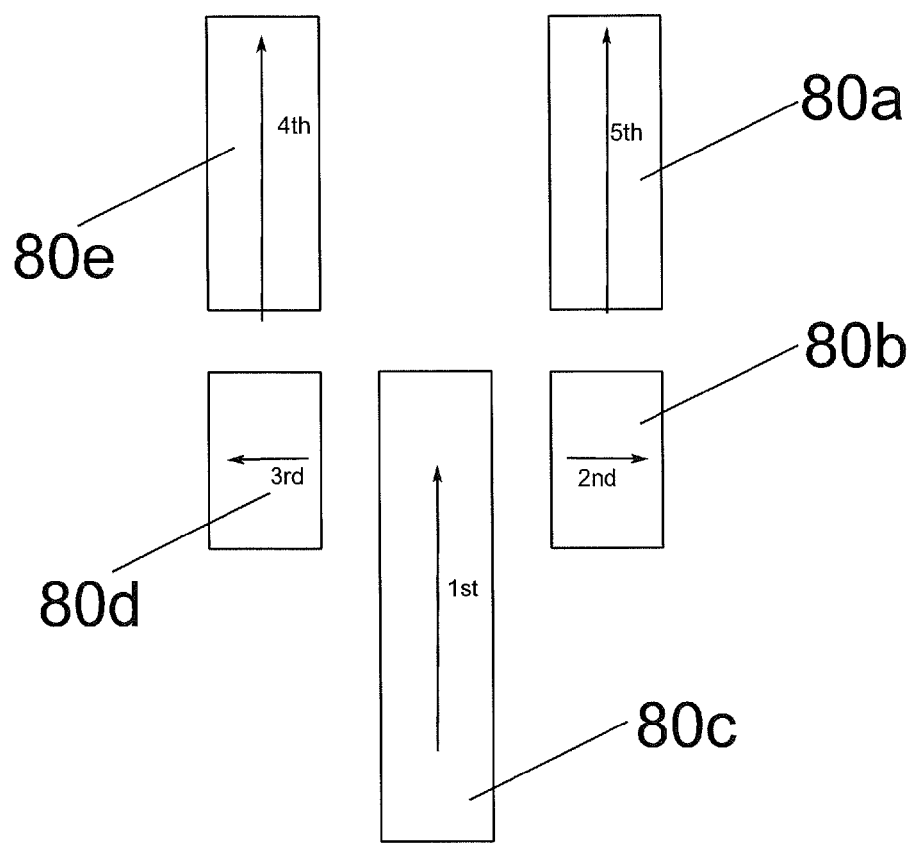
Figure 3:
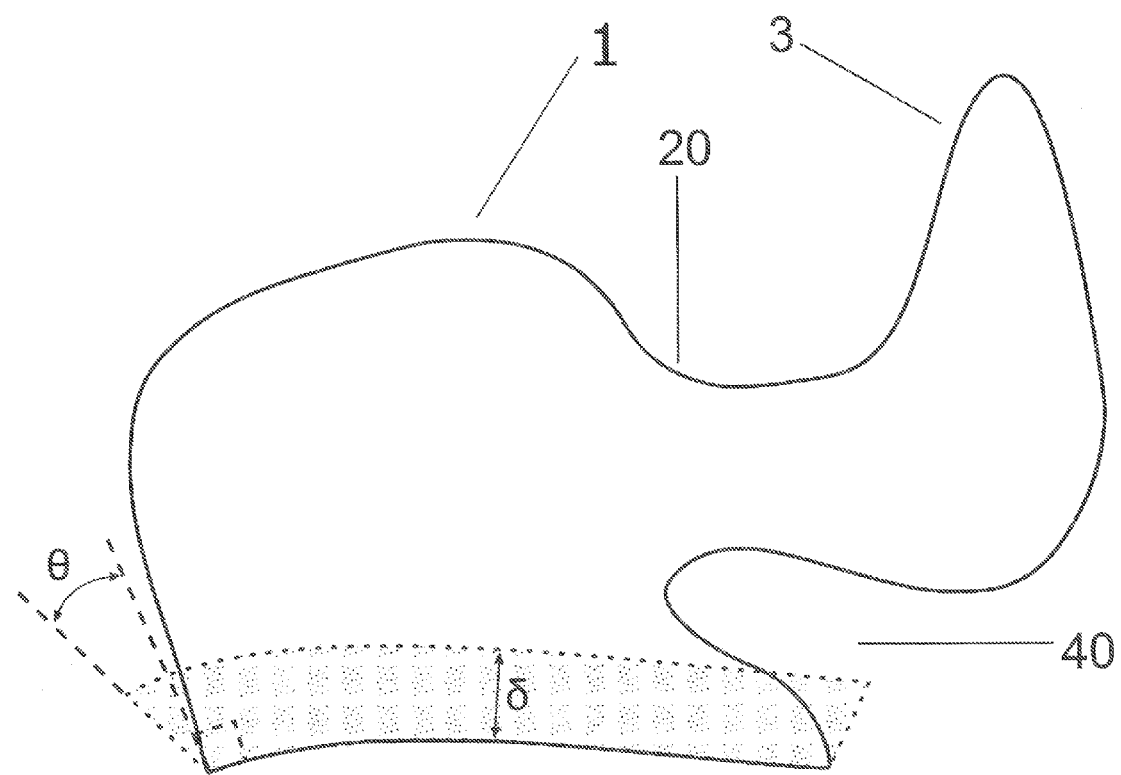
FIG. 3 is an elevation view of a hypothetical part intended to be built via additive manufacturing.

The decomposition process can be understood in view of FIG. 3 and FIGS. 4A-4C. As shown in FIG. 3 a part 1 to be built has an irregular shape 20 that includes a portion 30 that overhangs empty space 40. To address this situation the decomposition methodology proceeds through a series of steps to create a new geometric description and build sequence of the part to create a build description that can be used in a CNC additive system.

Figure 4A:
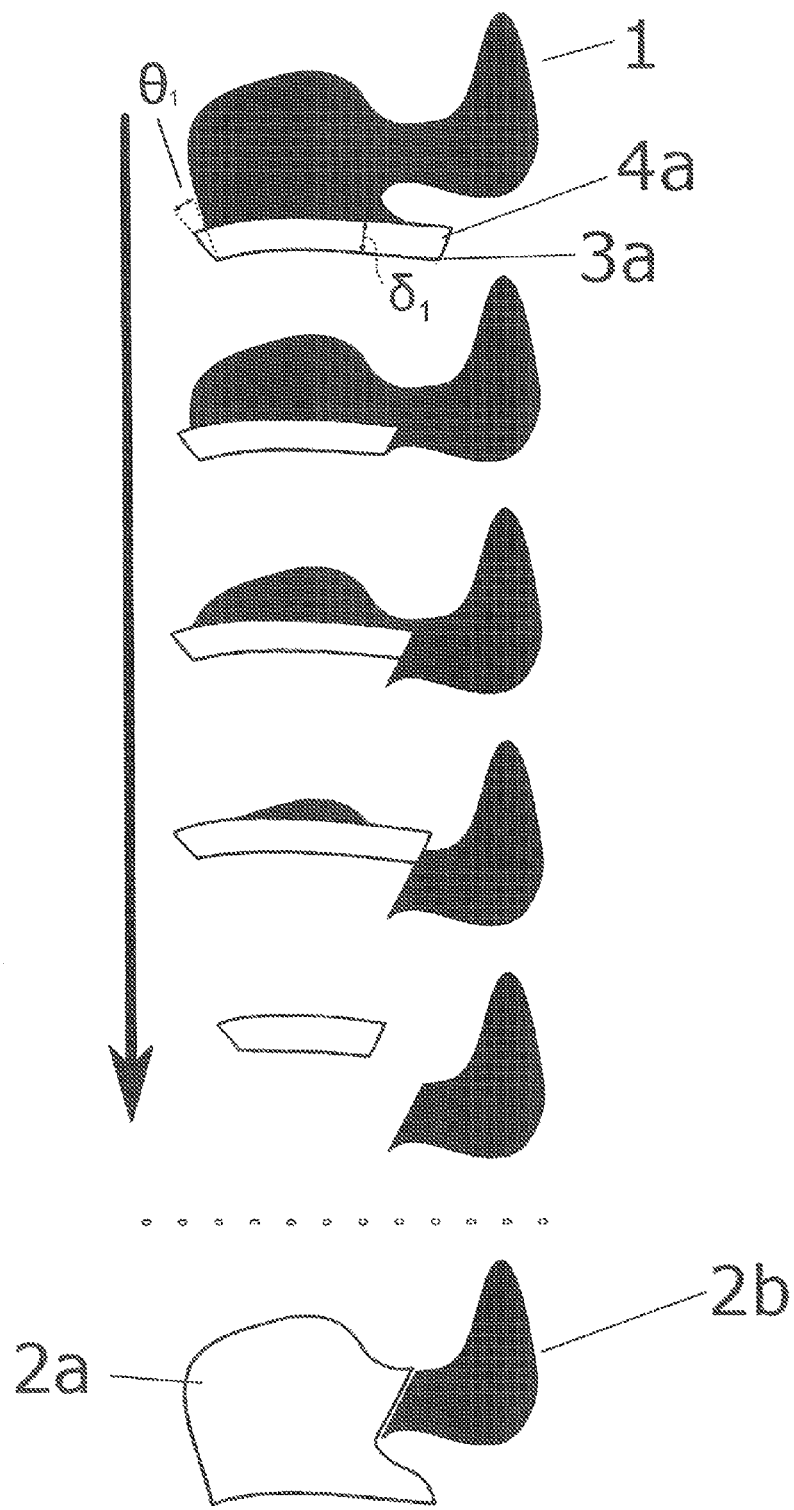
FIGS. 4A-4C depict the part of FIG. 3 undergoing virtual decomposition in furtherance of creating a build description that includes a refined geometrical description composed of substructures of the part and a build sequence for these substructures.
Figure 4B:
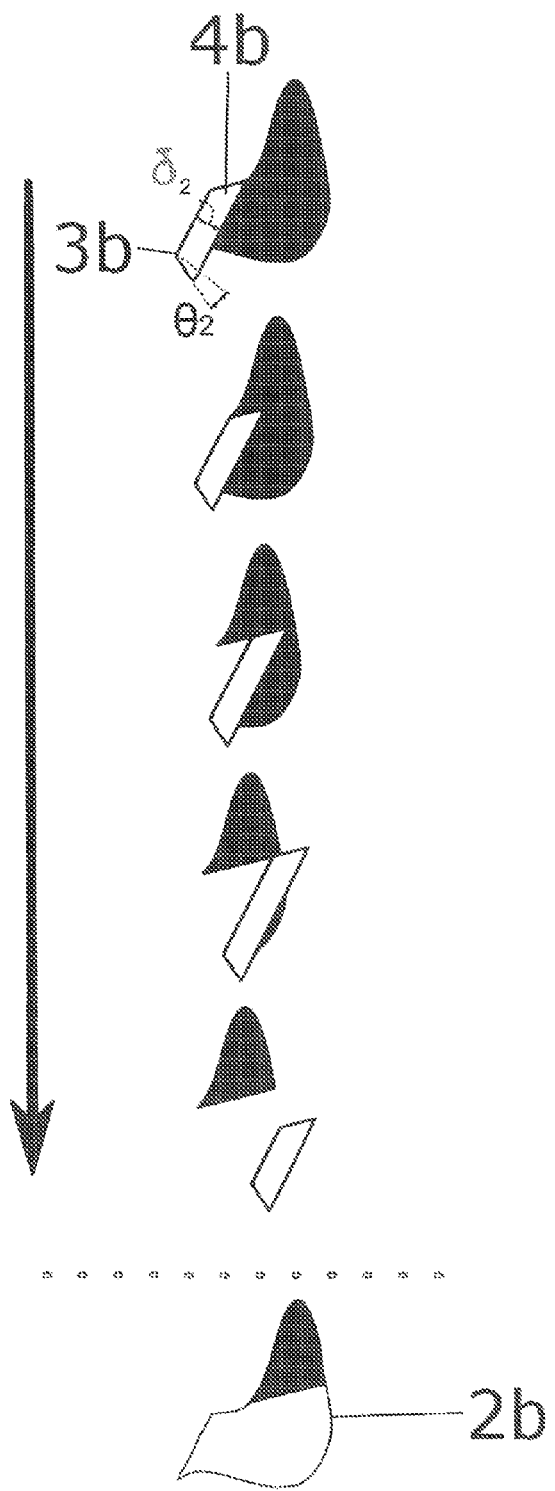
Figure 4C:
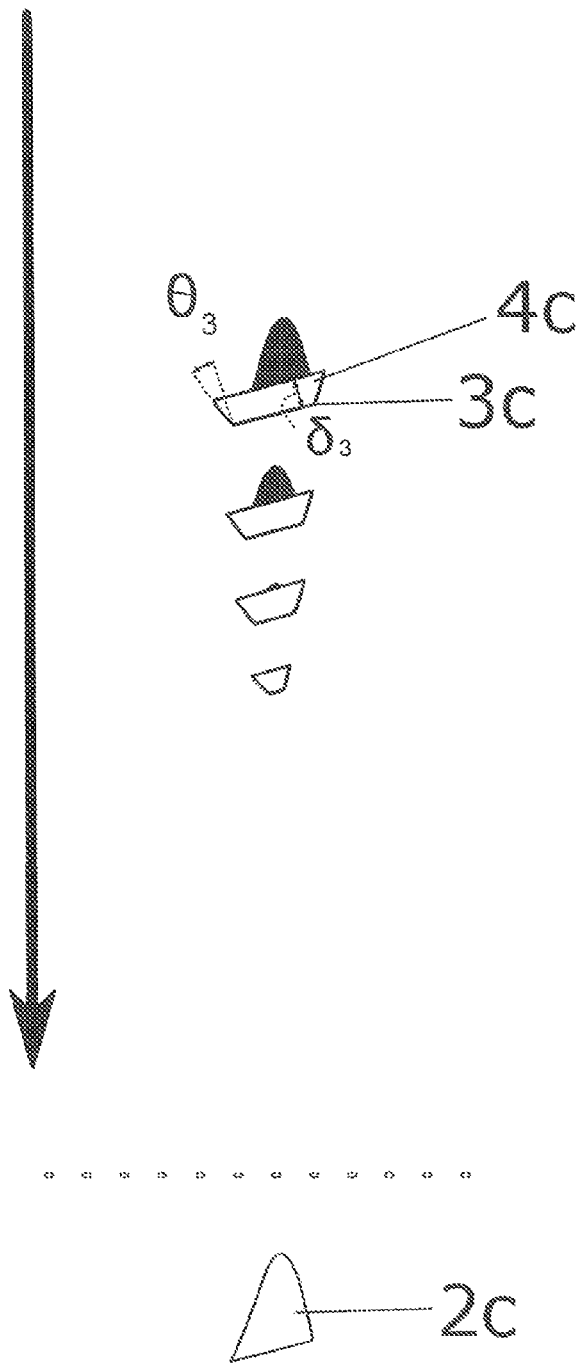

As shown in FIG. 3 and FIGS. 4A-4C, the method involves dividing the geometry of a target component (the part) 1 into substructures 2 suitable for additive manufacturing. In FIGS. 4A-4C, the part 1 of FIG. 3 is representatively broken down into three substructures 2a, 2b and 2c. Each substructure can be treated as a separate additive feature and is defined as a geometry that is accessible from a set of view angles (θ) from a known starting surface 3 (shown in the figures as surfaces 3a, 3b and 3c respectively for each substructure). Each decomposition step proceeds piecewise fashion as defined by a geometry interrogation interval 4. To decompose a substructure, geometry interrogation intervals are sequentially virtually subtracted from the substructure starting from the selected starting surface. Substructures are iteratively removed from the target component geometry until all of the geometry has been processed. This iteration can be automated or human-guided. FIGS. 4A-4C show a complete example of the decomposition process carried out on the build of FIG. 3. In the representative example of these figures, the geometry requires three iterations, resulting in three separate substructures. Each iteration of the decomposition method applied to a portion of the part will result in one substructure and zero or more remaining pieces of part geometry.

The geometric description and build sequence of the part that forms the build description is created by decomposing the overall geometry of the part by identifying a first substructure 2a of the part. The first substructure has a first starting surface 3a and a first interrogation interval 4a. The first starting surface 3a represents a surface at which additive layering of the first substructure can begin. The first interrogation interval 4a is defined by a first overhang angle $\theta_1$ and a first interval height $\delta_1$.

The overhang angle $\theta$ represents an amount of material overhang for each substructure that is allowed by virtue of the equipment and process employed. For example, some equipment can better articulate a part, which would allow for more overhang. Also, the material involved and temperature environment will affect allowable overhang. In this respect, different materials have different surface tensions which results in different overhang parameters. Also, the gas used in the build chamber will also affect the allowable overhang. These factors are used to select the allowable overhang that can be tolerated during building of a substructure.

With respect to the interrogation interval, the smaller the interval height $\delta$, the better. The interrogation interval height should be selected as close as possible to the layering thickness of the machine environment to better represent the geometry of the subject substructure. In the figures the interrogation interval is oversized for purposes of visual ease.

The first substructure 2a is virtually decomposed by starting from the first starting surface and sequentially subtracting layers of interrogating intervals defined by the first overhang angle $\theta_1$ and a first interval height $\delta_1$ from first substructure 2a until the first substructure is removed and only a second portion of part 1 remains. From this second portion, a second substructure 2b is identified. Second substructure 2b has a second starting surface 3b and a second interrogation interval 4b. As with the first substructure, the second starting surface 3b represents a surface at which additive layering of the second substructure 2b can begin, the difference being manufacture of the second substructure 2b would commence once the first substructure 2a is additively manufactured. The second interrogation interval 4b is defined by a second overhang angle $\theta_2$ and a second interval height $\delta_2$. The second substructure 2b is virtually decomposed by starting from the second starting surface 3b (which, as shown in the drawings, is contiguous with a portion of the first substructure) and sequentially subtracting interrogation intervals (i.e., layers) 4b defined by the second overhang angle $\theta_2$ and a second interval height $\delta_2$ from the second substructure 2b until second substructure 2b is virtually decomposed.

If after decomposing a substructure, no portion of the part remains, the process of creating the refined geometric description and build sequence terminates. Otherwise, this process of creating the build description is repeated and continues for so long as any portion of the part remains. In other words, for each remaining portion of the part a next substructure is identified along with a starting surface and an interrogation interval. Each interrogation interval has a defining overhang angle $\theta$ and interval height $\delta$. Hence, in the process depicted in FIGS. 4A-4C, the decomposition process proceeds to decompose a third substructure 2c having a starting surface 3c and using an interrogation interval 4c defined by an interval height $\delta_3$ and overhang angle $\theta_3$. The starting surface for each identified substructure represents a surface at which additive layering of that substructure can begin once a substructure before it is additively manufactured. Hence, each starting surface after the first starting surface is contiguous with at least one substructure of the part. Each substructure is sequentially virtually decomposed until the part is completely decomposed, thereby creating a build description that is made up of the new geometric description of the part in terms of substructures and a build sequence that orders the building sequence of substructures.

Figure 5A:
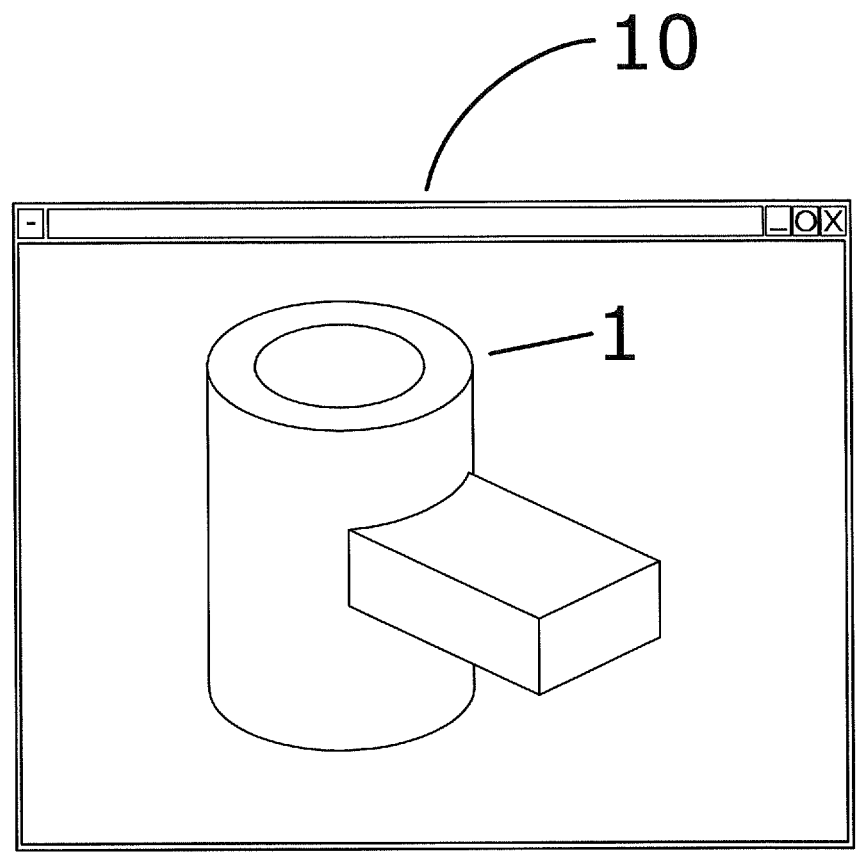
FIGS. 5A-5H depict screenshots of a computer system display in which the computer system is in the process of decomposing a part to create a build description of the part.
Figure 5B:
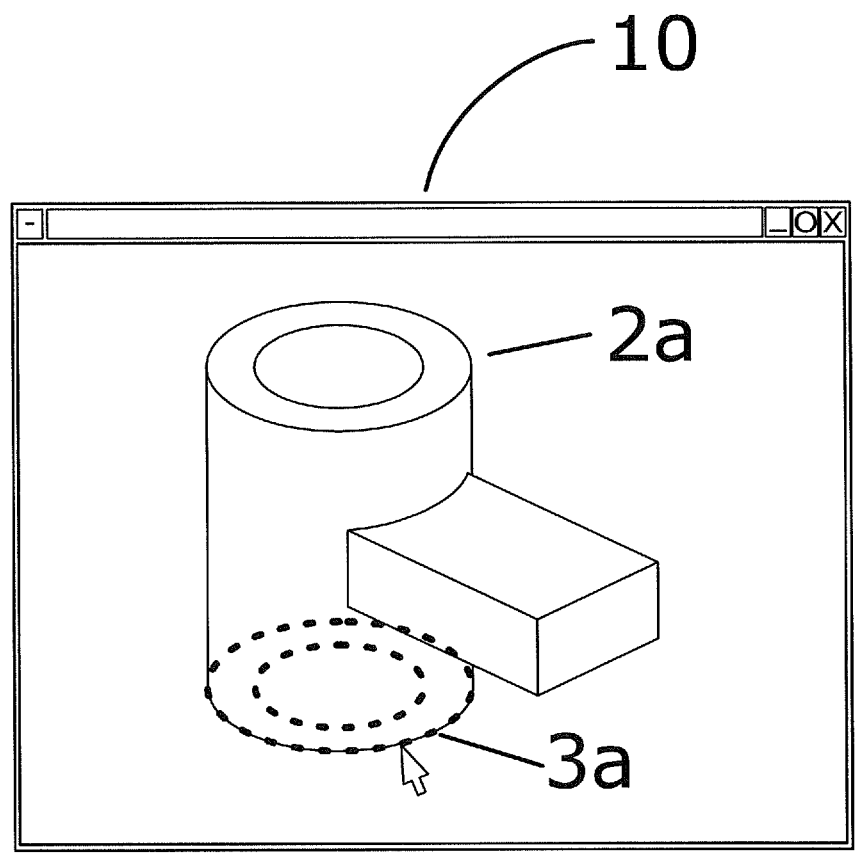
Figure 5C:
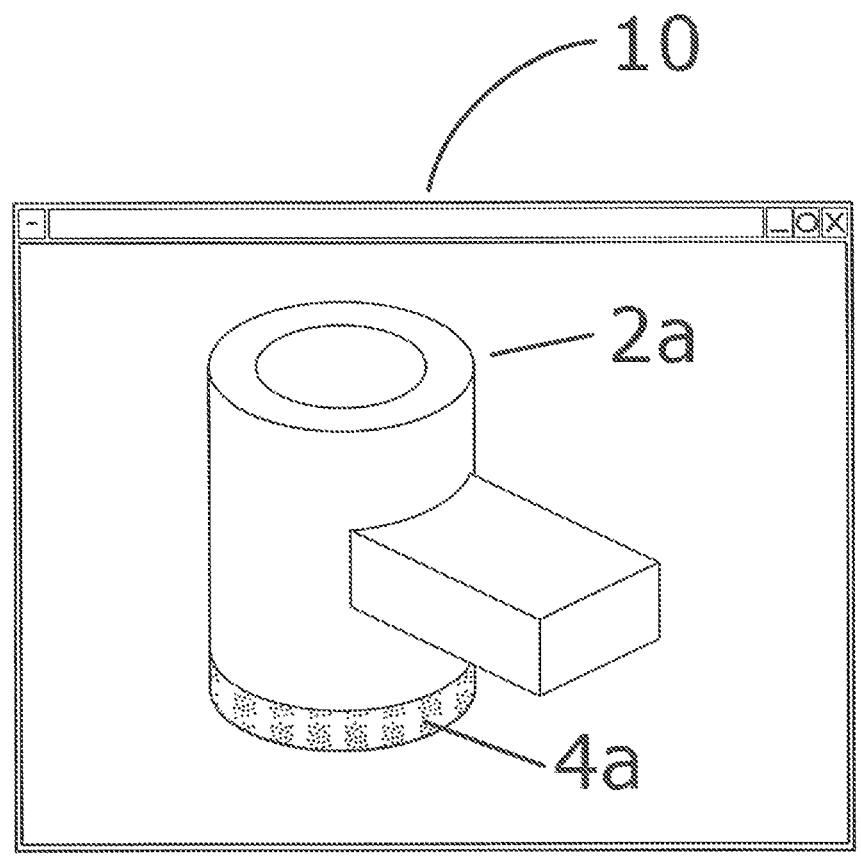
Figure 5D:
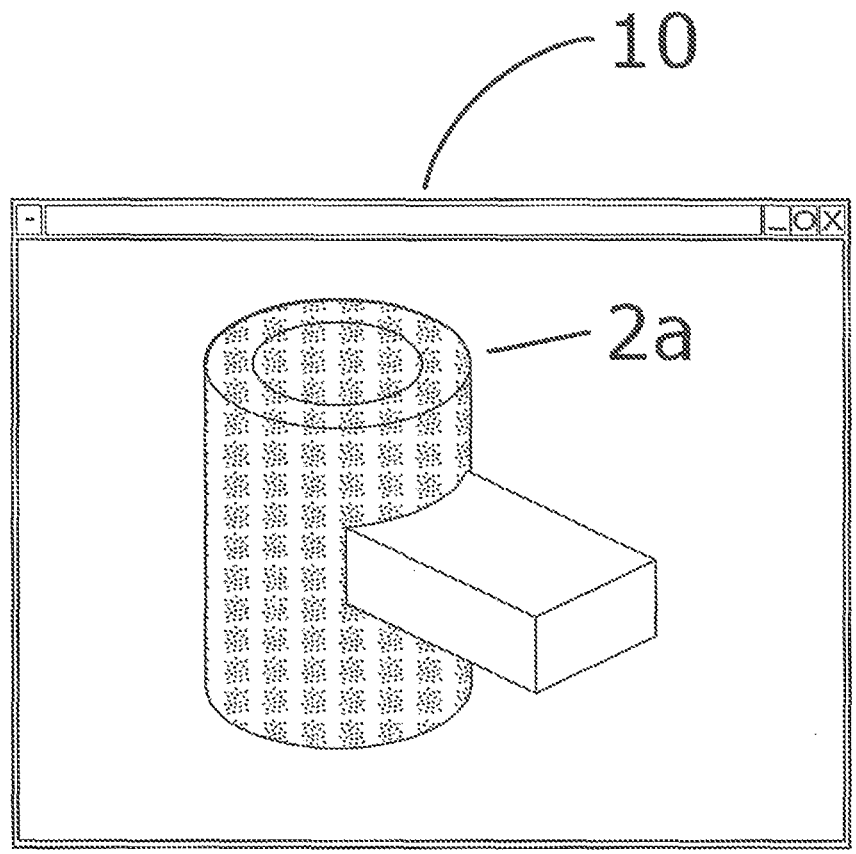
Figure 5E:
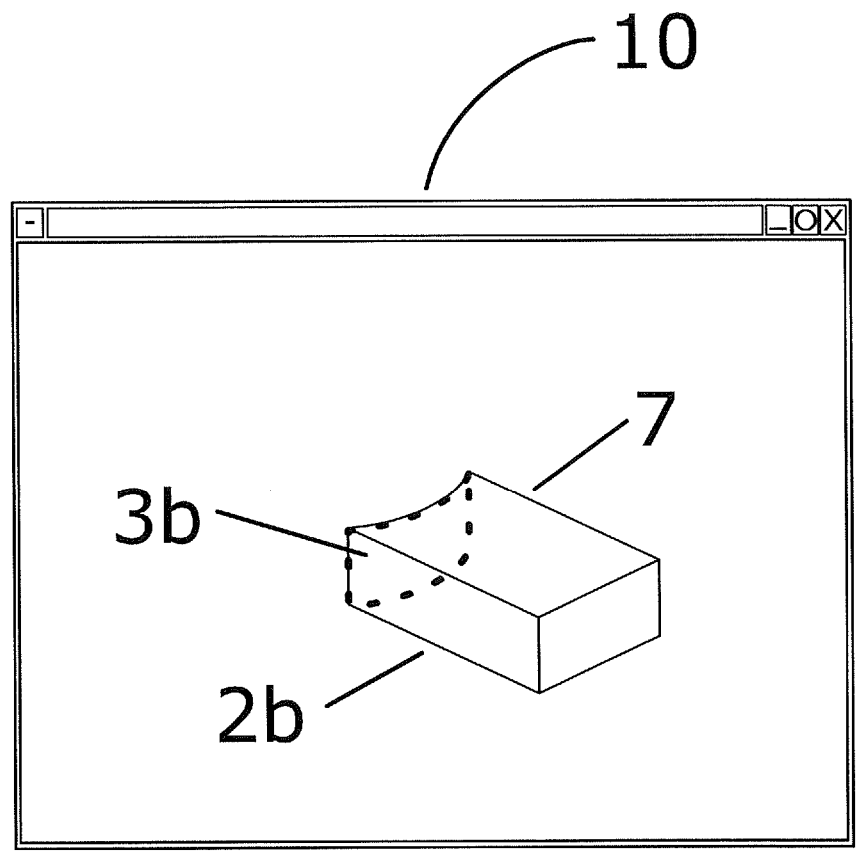
Figure 5F:
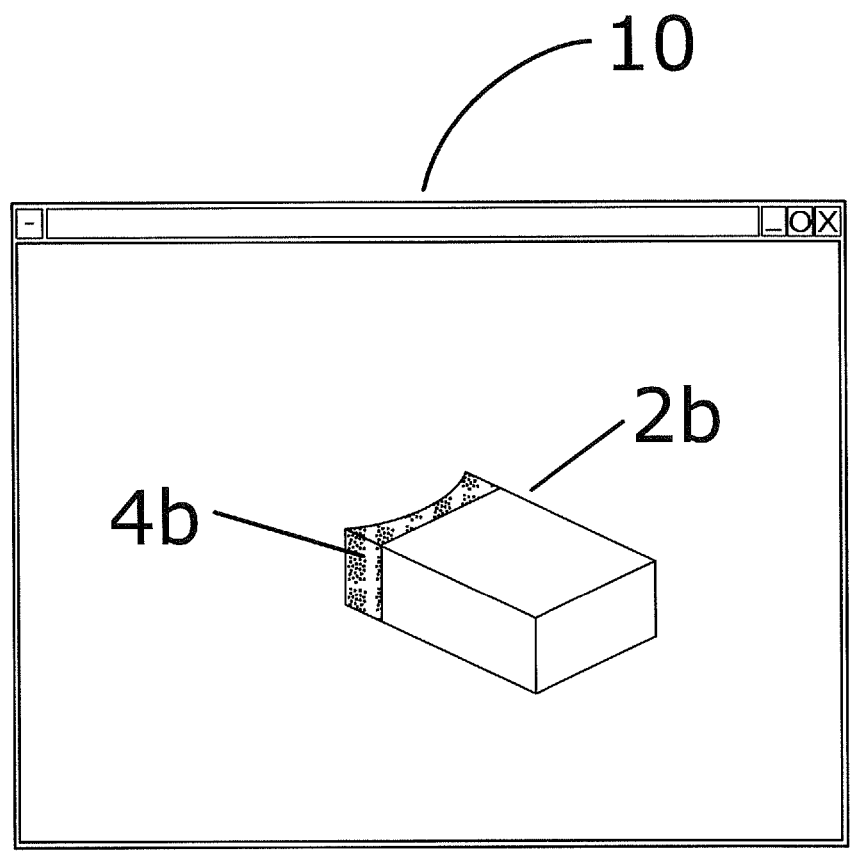
Figure 5G:
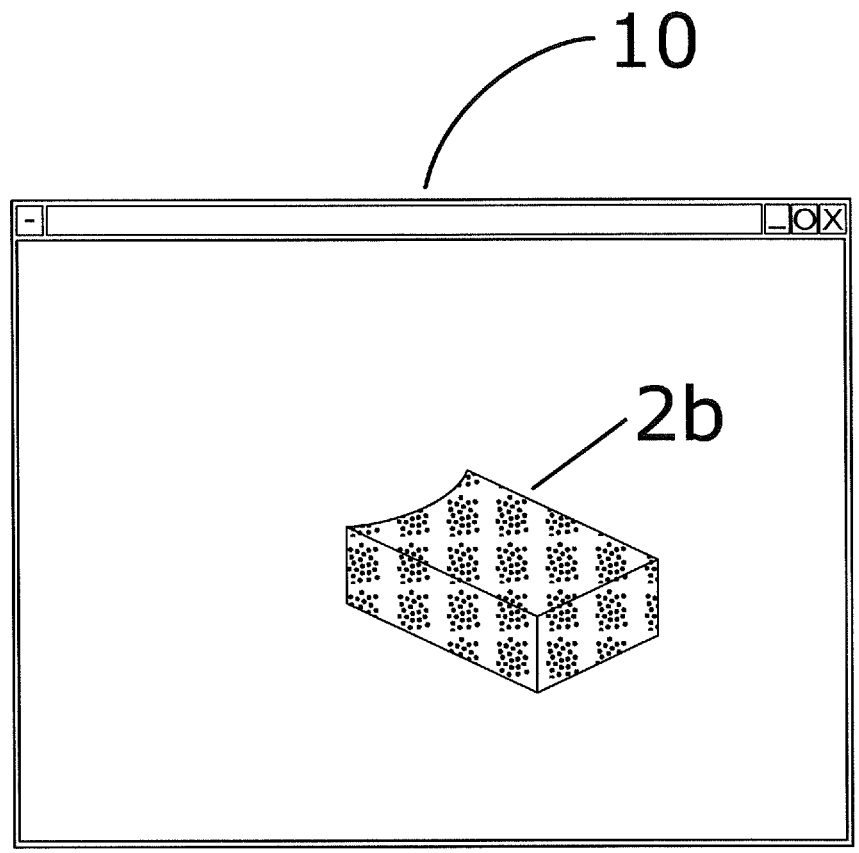
Figure 5H:
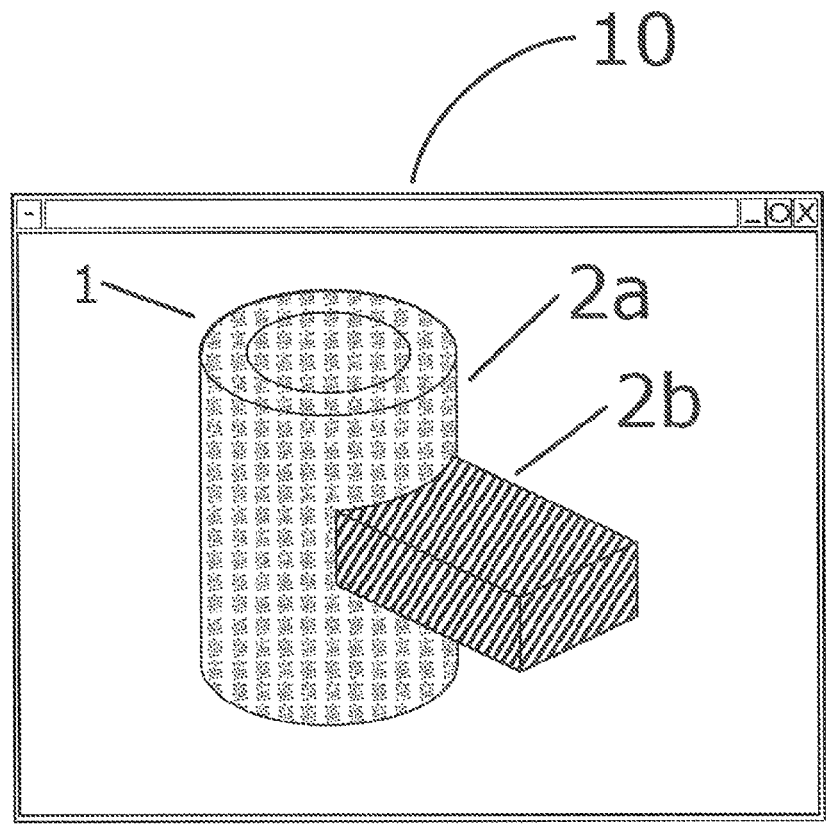

FIGS. 5A-5H depict screenshots 10 of a computer system display in which the computer system is in the process of decomposing a part intended to be built by additive manufacturing in order to create a geometric description and build sequence of the part. As shown in these figures, the overall geometry of part 1 is entered into the computer (FIG. 5A). A starting surface 3a (dotted lines) is selected in FIG. 5B. Then in FIG. 5C the decomposition procedure begins using interrogation interval 4a on a first substructure 2a (the cylindrical portion of the part). Iteratively applying the interrogation interval 4a to first substructure 2a results in virtual removal of the cylindrical substructure shown in FIG. 5D. In FIG. 5E a second starting surface 3b (outlined by dotted lines) from which to begin a second decomposition process against the remaining portion 7 of part 1 is identified. In the case of this example, the remaining portion 7 matches the second substructure 2b of the decomposition process. Then in FIG. 5F the decomposition process of substructure 2b begins using interrogation interval 4b on the second substructure 2b. Iteratively applying the interrogation interval 2a to substructure 2b results in virtual removal of the tongue-like substructure shown in FIG. 5G. Because remaining portion 7 matched second substructure 2b, the decomposition process will be complete upon the virtual decomposition of substructure 2b. In FIG. 5H the display shows the decomposed part 1, re-assembled with its constituent substructures detailed for making a build sequence. The invention thus includes a novel creation operation which creates a build description via a significantly better geometric description and a build sequence for the part. It does so by using the starting surface of each substructure as an input and extruding from the face points of that surface in a normal direction a distance of one interrogation interval—the interrogation height $\delta$. The top surface of the interrogation interval is formed by extending the top surface such that the allowable overhang angle $\theta$ is satisfied.

The decomposition process can be described mathematically via the following equations.

Boolean intersection:

$$G_{isect} = G_{remainder} \setminus G_{int} \qquad (a)$$

Boolean subtraction:

$$G_{model} = G_{remainder} \cup (\neg G_{isect}) \qquad (b)$$

where $G_{isect}$ is geometry considered at the current interrogation level.

$G_{remainder}$ is current geometry of the model.

$G_{int}$ is the geometry of the interrogation volume.

$$S_{continuation} = \Gamma(G_{remainder}, G_{removed}) \qquad (c)$$

where $S_{continuation}$ is a set of surfaces for continued decomposition operations.

$G_{removed}$ is geometry a removed volume from a previous decomposition step.

$\Gamma$ (A, B) is an operator which returns the contact surface(s) between volumes A and B. Using the $\Gamma$ function, surface for continued decomposition can be determined. When $\Gamma$ returns a null set, the decomposition activity is concluded. The boolean union of all of the substructures is identical to the original input geometry.

One embodiment method for building a part having an overall geometry by way of an additive layering process comprises creating a refined geometric description of the part by decomposing the overall geometry of the part. This is done by identifying a first substructure of the part. The first substructure has a first starting surface and a first interrogation interval. The first starting surface represents a surface at which additive layering of the first substructure can begin. The first interrogation interval is defined by a first overhang angle $\theta_1$ and a first interval height $\delta_1$. The first substructure is virtually decomposed by starting from the first starting surface and sequentially subtracting layers equal to the first interrogation interval from the first substructure until the first substructure is removed and only a second portion of the part remains. A second substructure from the second portion of the part is identified. The second substructure has a second starting surface and a second interrogation interval. The second starting surface represents a surface contiguous with the first substructure and at which additive layering of the second substructure can begin once the first substructure is additively manufactured. The second interrogation interval is defined by a second overhang angle $\theta_2$ and a second interval height $\delta_2$. The second substructure is virtually decomposed by starting from the second starting surface and sequentially subtracting layers equal to the second interrogation interval from the second substructure until the second substructure is removed. This process is continued for so long as any portion of the part remains. The starting surface for a later identified substructure represents a surface contiguous with a previously decomposed substructure and at which additive layering of that later identified substructure can begin once the previously decomposed substructure is additively manufactured. Once the part is fully decomposed, a sequence is determined for building by additive layering all of the substructures previously identified. The part is built by additively layering each substructure of the part in the sequence determined.

In another embodiment, the invention is directed to a method of controlling beam power during an additive deposition process employing a beam source at a point P(s) along an additive path that will be traveled to form a part during the additive deposition process. The method comprises creating a build description for the part by the decomposition and build sequence determination process described above. A path description is created based upon the build description that represents the path of the beam source through space during the additive process. The mass of the part is calculated at a point P(s) during the additive process based upon the build description. The power of the beam emitted by the beam source at the point P(s) of the additive path is modulated based upon the mass of the part at the point P(s) during the additive process.

In another embodiment the invention is directed to a system for fabricating a part on a substrate using a deposition beam source that emits a beam that follows an additive path composed of a plurality of points. The system comprises a substrate support for supporting the substrate and manipulating it through space and a metal stock delivery system. The system further includes a controllable beam source capable of emitting a beam onto the substrate and adapted to form a melt pool thereon. The system has a database for storing a build description as described above for the part. In this respect, the build description comprises: a first identified substructure of the part and one or more additional identified substructures of the part, with each additional identified substructure being contiguous with at least one other substructure of the part; and a build sequence for the part that sets forth a sequence of building by additive layering each of the identified substructures. The system includes a controller adapted to control power to the beam source. The controller is programmed to receive as an input the build description and regulate energy of the produced beam for any point on the additive path based upon the build description.

The decomposition process described above has been incorporated into a system and method for calculating a heat source power schedule for additive manufacturing. In this respect the decomposition method described above can be used to create the build description for a part, which build description can then be used in the below-described laser power prediction method. The method utilizes the following items to create an improved thermodynamic model of the work piece to compute needed laser power at intervals during the additive process. The method does so using: a) an additive path describing the path of the laser through space; b) a geometric representation of the geometry that the additive path is intended to create (i.e., the build description method described above); c) a description of the thermodynamic characteristics of the manufacturing environment; and d) computed thermophysical characteristics of the materials involved. This model is used to predict an appropriate input laser power at definable intervals along the laser path. It accomplishes this by using the path and geometric representation of the part being produced to create an idealized geometry that allows for tenable calculations.

Figure 6:
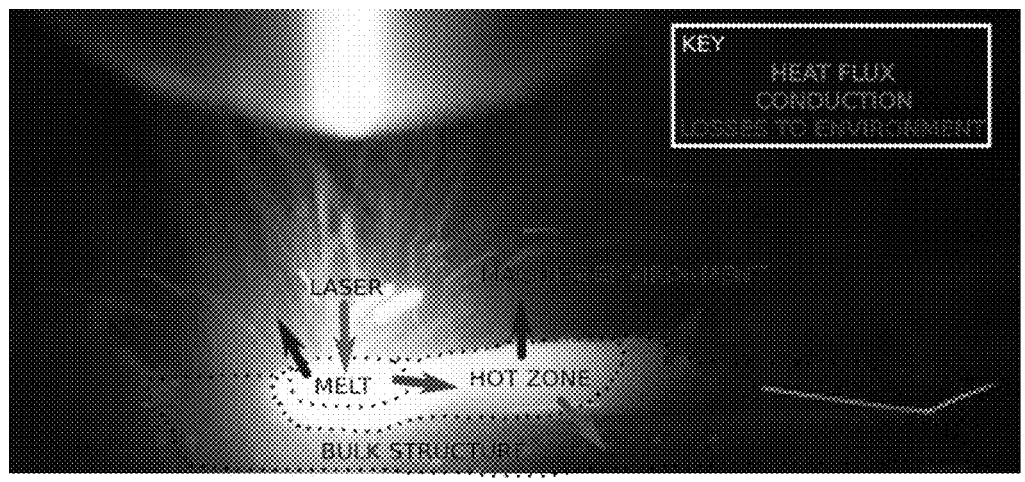
FIG. 6 is a photograph of a build undergoing additive metal layering showing the thermodynamic constituents of the workpiece used to formulate an idealized geometry of the present invention.
Figure 7:
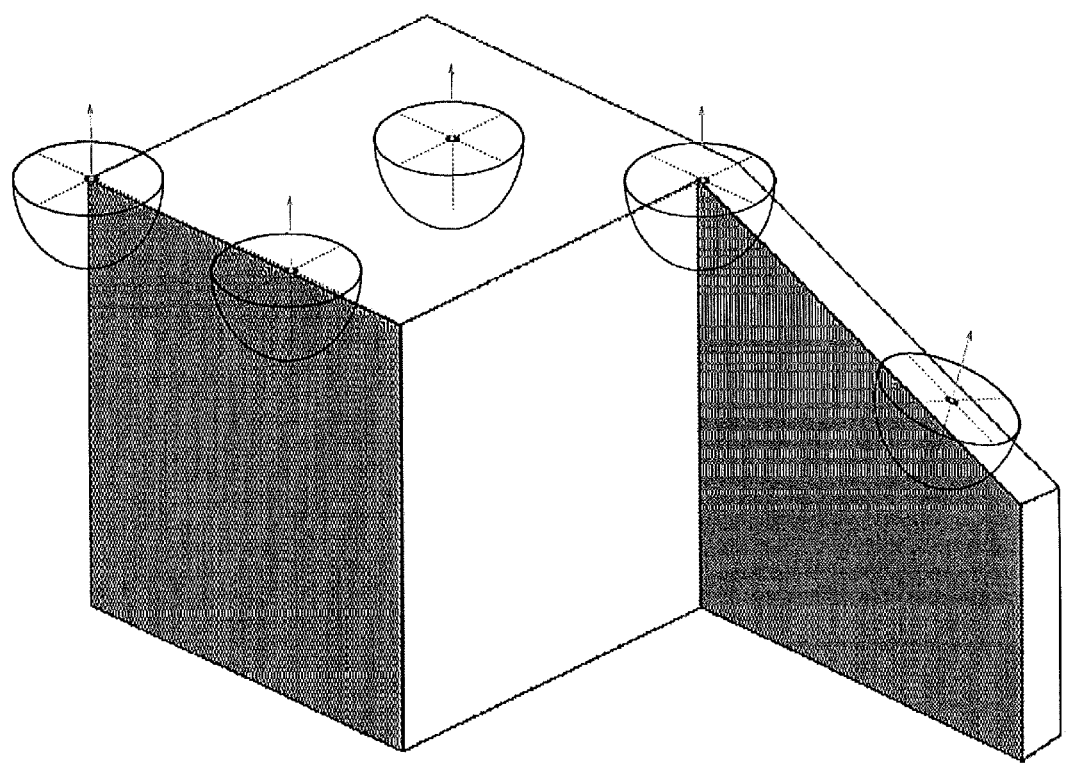
FIG. 7 is a diagram showing the hemisphere oriented technique used to estimate hot zone shape and connectivity of the bulk of the workpiece structure.
Figure 8A:
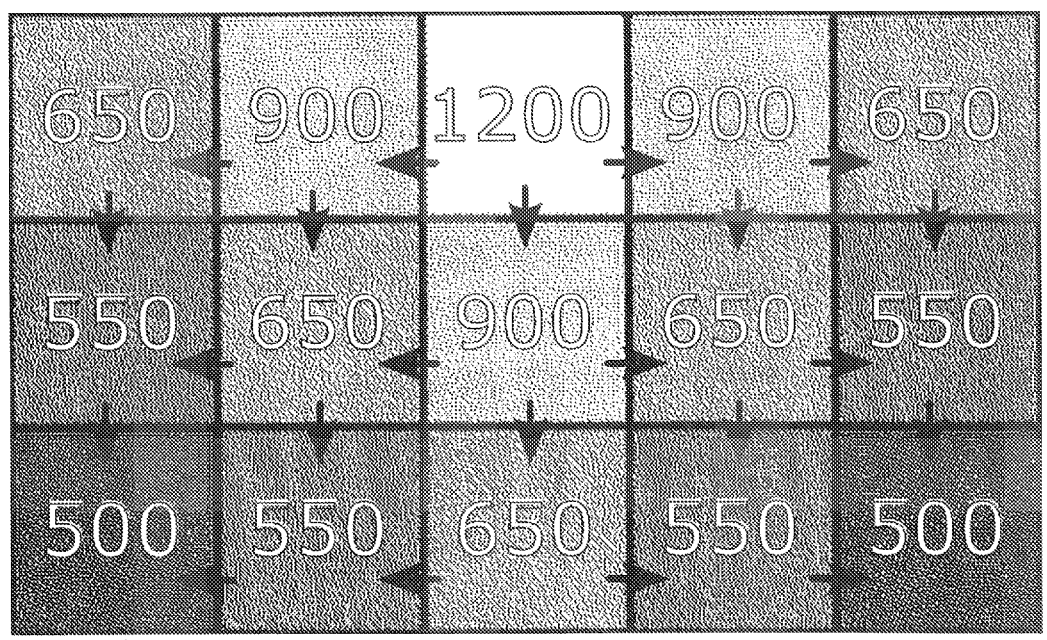
FIG. 8A depicts the conventional Eulerian FEM model used to estimate heat conduction through a structure.
Figure 8B:
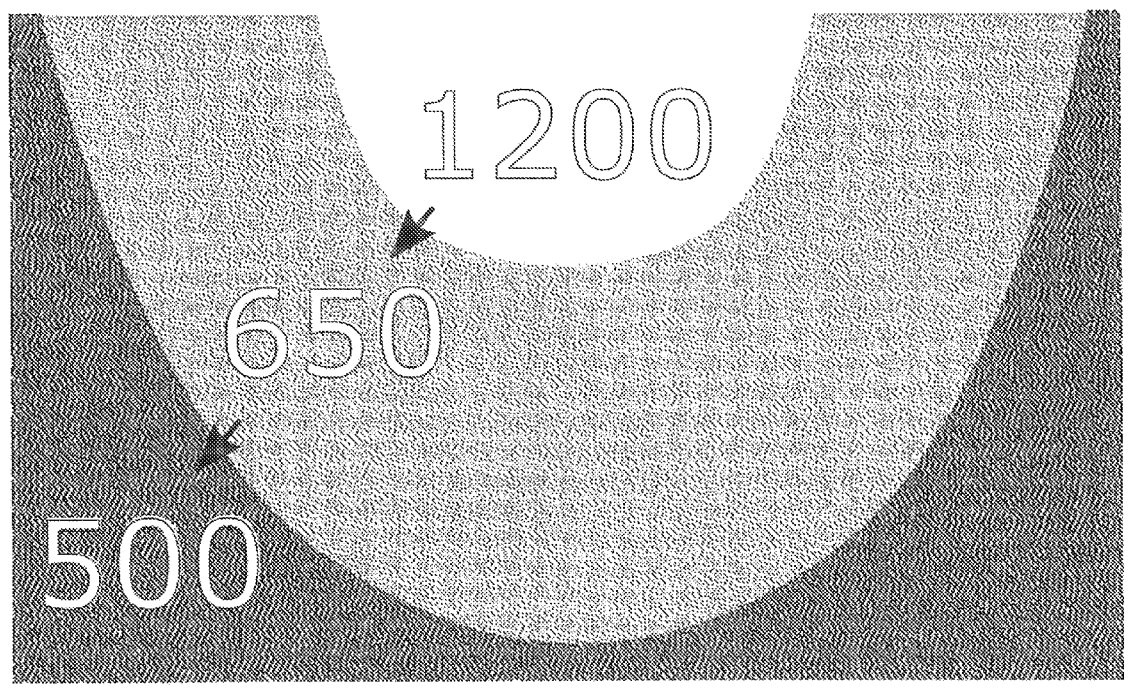
FIG. 8B depicts the simplified method used to estimate heat conduction through a structure that is employed as part of the present invention predictive method.

As shown in FIG. 6, a workpiece undergoing additive laser deposition includes various regions that respond to input beam energy. These regions are utilized to create an idealized geometry for a thermodynamic model. As shown in FIG. 6 a workpiece subject to laser impact comprises: a) a molten puddle (melt pool); b) a region of hot material in direct contact with the molten puddle (hot zone); and c) a mass representing the substrate material and part geometry not represented by the other two regions (bulk). Estimating the hot zone is accomplished by intersecting hemispheres oriented in the direction of the tool axis with the part geometry. This technique is shown in FIG. 7. The model's advantage over a more conventional Eulerian finite element method ("FEM") mode is demonstrated in FIGS. 8A and 8B. As shown in these figures, the number of calculations (represented by the arrows) necessary to compute the heat conduction through the domain in the inventive model is less than the conventional Eulerian FEM model. Applying the domain-specific knowledge to create the simplified model for predicting laser power allows for the computation of laser power with higher frequency and good numerical stability.

The laser power input is calculated by performing an energy balance calculation at intervals along the laser's path with the following considerations:

1. Conduction from the melt pool to the hot zone;
2. Conduction from the hot zone to the bulk of the particular workpiece;
3. Conduction from the bulk of the part to the clamping system of the CNC machine;
4. Radiation from the melt pool;
5. Radiation from the hot zone;
6. Convection from the melt pool;
7. Convection from the hot zone;
8. Convection from the bulk structure;

9. Process activity at the current point (i.e. is the laser supposed to be on now or not?);
10. Mass of the hot zone; and
11. Area for conduction between the hot zone and bulk structure.

Relevant to describing and demonstrating the inventive method are the following elements and symbols, which have the meanings indicated.

Material Properties
Specific heat, $C_p$
Thermal conductivity, k
Density, $\rho$
Laser absorption coefficient, $\alpha$
Liquidus temperature, $T_l$
Emissivity, $\epsilon$
heat of fusion, $H_f$
heat of the build, $H_{build}$
mass of the build, $m_{build}$
mass of the substrate, $m_{sub}$
temperature of the build, $T_{build}$
ambient temperature, $T_{amb}$
temperature of the hot zone, $T_{hot}$
point on the path, s
Machine Parameters
Maximum laser power, $Q_{max}$
Ambient temperature, $T_{amb}$
Machine temperature, $T_{mach}$
Area for part→machine heat transfer, $A_{mach}$
Powder supply temperature, $T_p$
Convection coefficient for the machine environment, h
Deposition Parameters
Layer thickness, $d_l$
track width, w
Remelt thickness as a fraction of layer thickness, r
Scan speed, f
Substrate mass, $m_{sub}$
Desired superheat, $T_{super}$
Laser Predictive Power Settings
Target hot zone radius, $r_{hot}$
Target melt pool temperature, $T_{melt}=T_l+T_{super}$
Target hot zone temperature, $T_{target}$
Laser power prediction interval, $i_p$
Physical Constants
Stefan-Boltzmann constant, $\sigma$
Nomenclature
Let s describe the length along the deposition path.
Let P describe the deposition path such that P(s) is the Cartesian coordinate at a distance of s along the path.
Let $\hat{t}(s)$ describe the tool axis direction at a distance of s along the path.
Let G describe the deposition geometry.
Let Z (r, p, $\hat{n}$) describe a hemisphere of radius r with the circular surface centered at point p with a normal direction of $\hat{n}$.

An exemplary calculation method thus proceeds as follows. First, before beginning the formal calculations representing the in-process thermodynamic environment, initial values are input based upon the starting temperature environment Initialize the energy content of the part:

$$H_{build}=C_p T_{amb} m_{sub} \quad (1)$$

Initialize the mass of the part:

$$m_{build}=m_{sub} \quad (2)$$

Initialize the temperature of the part:

$$T_{build}=T_{amb} \quad (3)$$

Initialize the hot zone temperature:

$$T_{hot}=T_{build} \quad (4)$$

Set the path to begin at the beginning:

$$s=0 \quad (5)$$

Useful constants should be then pre-calculated.
Maximum volume of the hot zone:

$$V_{max}=\tfrac{2}{3}r^3_{hot}\pi \quad (6)$$

Maximum area of the hot zone:

$$A_{max}=2r^2_{hot}\pi \quad (7)$$

Approximate surface area of the melt pool:

$$A_{melt}=\tfrac{1}{4}w^2\pi \quad (8)$$

Mass per unit length of deposition $$m_{ul}=wd_l\rho \quad (9)$$

Time for the laser to traverse one calculation interval:

$$\Delta t=i_p/f \quad (10)$$

With the above initial pre-calculation steps undertaken, one can proceed to calculate needed laser power along a given deposition path according to the following method.

A. Calculate the geometry index for the current position.

$$V_{hot}=G\cap Z(r_{hot},P(s),\hat{t}(s)) \quad (11)$$

$$A_{hot}=V_{hot}A_{max}/V_{max} \quad (12)$$

B. Compute the energy balance at the melt pool.
1. Energy radiated from the melt pool:

$$H_{rad}=\epsilon\sigma A_{melt}(T^4_{melt}-T^4_{env})\Delta t \quad (13)$$

2. Energy conducted from the melt pool to the hot zone:

$$H_{cond}=kA_{hot}/r_{hot}(T_{melt}-T_{hot})\Delta t \quad (14)$$

3. Energy lost due to convection at the melt pool:

$$H_{conv}=hA_{melt}(T_{hot}-T_{env})\Delta t \quad (15)$$

C. Compute the laser power.
1. Energy required to melt the powder:

$$H_{powder}=m_{ul}i_p((T_{melt}-T_p)C_p+H_f) \quad (16)$$

2. Energy required to remelt the existing material:

$$H_{remelt}=m_{ul}i_p r((T_{melt}-T_{hot})C_p+H_f) \quad (17)$$

3. Total energy required for this step:

$$H_{total}=H_{powder}+H_{remelt}+H_{rad}+H_{cond}+H_{conv} \quad (18)$$

4. Calculate a viable laser power:

$$Q_{laser}=\min(Q_{max},H_{total}/\alpha\Delta t) \quad (19)$$

D. Update the mass of the build.

$$m_{build}=m_{build}+m_{ul}i_p \quad (20)$$

E. Calculate the energy losses at the build.
1. Estimate an effective radius and area of the build for the purposes of heat transfer calculations:

$$r_{build}=3\sqrt[3]{3m_{build}/\rho 4\pi} \quad (21)$$

$$A_{build}=4r^2_{build}\pi \quad (22)$$

2. Energy radiated from the hot zone:

$$H_{hot}=\epsilon\sigma A_{hot}(T^4_{hot}-T^4_{amb})\Delta t \quad (23)$$

3. Energy conducted from the build to the machine:

$$H_{mach}=(kA^{machine}/r_{build})(T_{build}-T_{mach})\Delta t \quad (24)$$

4. Energy lost due to convection to the machine environment:

$$H_{env} = hA_{build}(T_{build} - T_{amb})\Delta t \quad (25)$$

F. Update enthalpy of the build.

$$H_{build} = H_{build} + Q_{laser}\Delta t - H_{mach} - H_{hot} - H_{env} \quad (26)$$

G. Update the build temperature.

$$T_{build} = H_{build}/C_p \quad (27)$$

H. Update the hot zone temperature estimate.

$$T_{hot} = (T_{build} + T_{target})/2 \quad (28)$$

I. Update the position along the deposition path.

$$s = s + i_p \quad (29)$$

J. If the path is not complete, return to step 1.

Figure 9A:
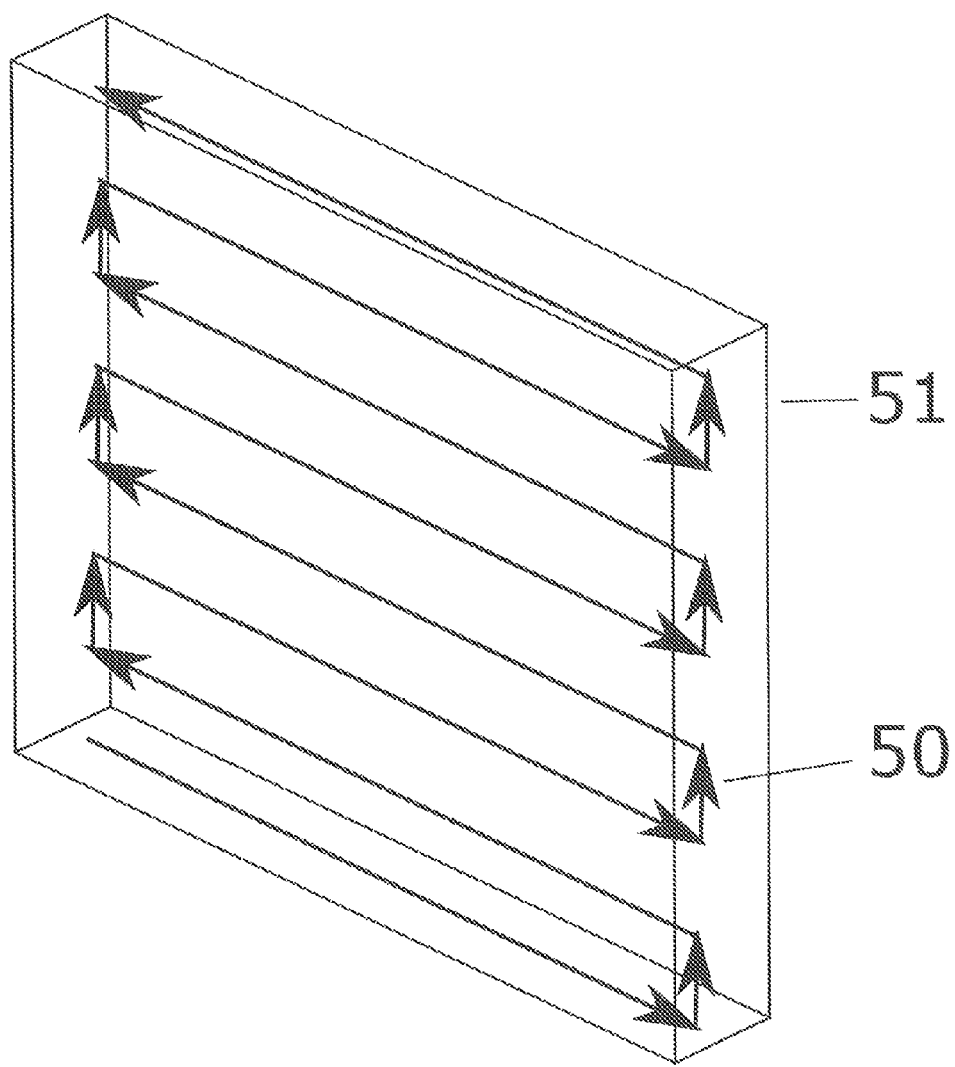
FIG. 9A depicts a simplified deposition path utilized when building a wall-shaped structure using additive laser deposition.
Figure 9B:
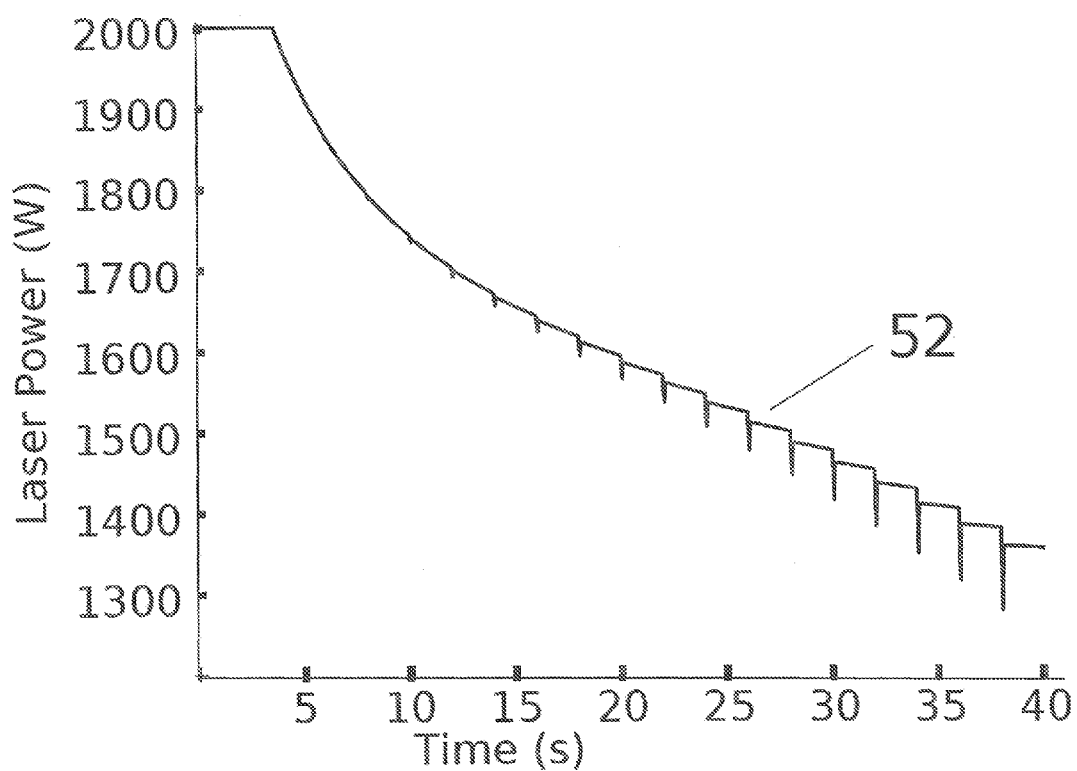
FIG. 9B is a graph showing predicted needed laser power over time for an additive metal deposition process used to build the wall structure of FIG. 9A. The predicted needed laser power is calculated at various intervals along the additive path process according to the present invention calculation technique.

These calculations are carried out in sequence with each result being an input for the next step in the process. For example, during the calculation of a laser power schedule for a 56.5 mm long×3.3 mm wide×190 mm tall rectangular structure (approximately 500 layers, ~20 minutes of real machine time), the laser power prediction algorithm calculated the appropriate laser power for 14502 discrete points along the path. FIG. 9A depicts a simplified deposition path 50 utilized when building a wall-shaped structure 51 using additive laser deposition. FIG. 9B is a graph 52 showing predicted needed laser power over time for an additive metal deposition process used to build the wall structure 51 of FIG. 9A. The periodicity of the predicted laser power shown in FIG. 9A is due to the laser reaching the corners of the wall structure, which reduces the area available for heat transfer away from the melt pool, resulting in less required laser power to maintain the desired energy balance. The predicted needed laser power is calculated at various intervals along the additive path process according to the present invention calculation technique. The computer controlling the laser power can be programmed to adjust laser power along the deposition path in accordance with the predicted levels of needed energy.

Figure 10A:
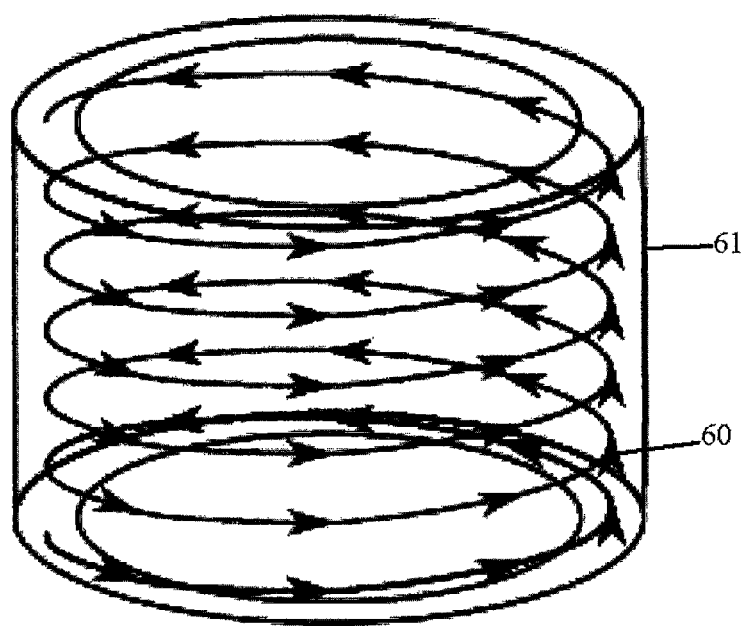
FIG. 10A depicts a simplified deposition path utilized when building a cylindrical-shaped structure using additive laser deposition.
Figure 10B:
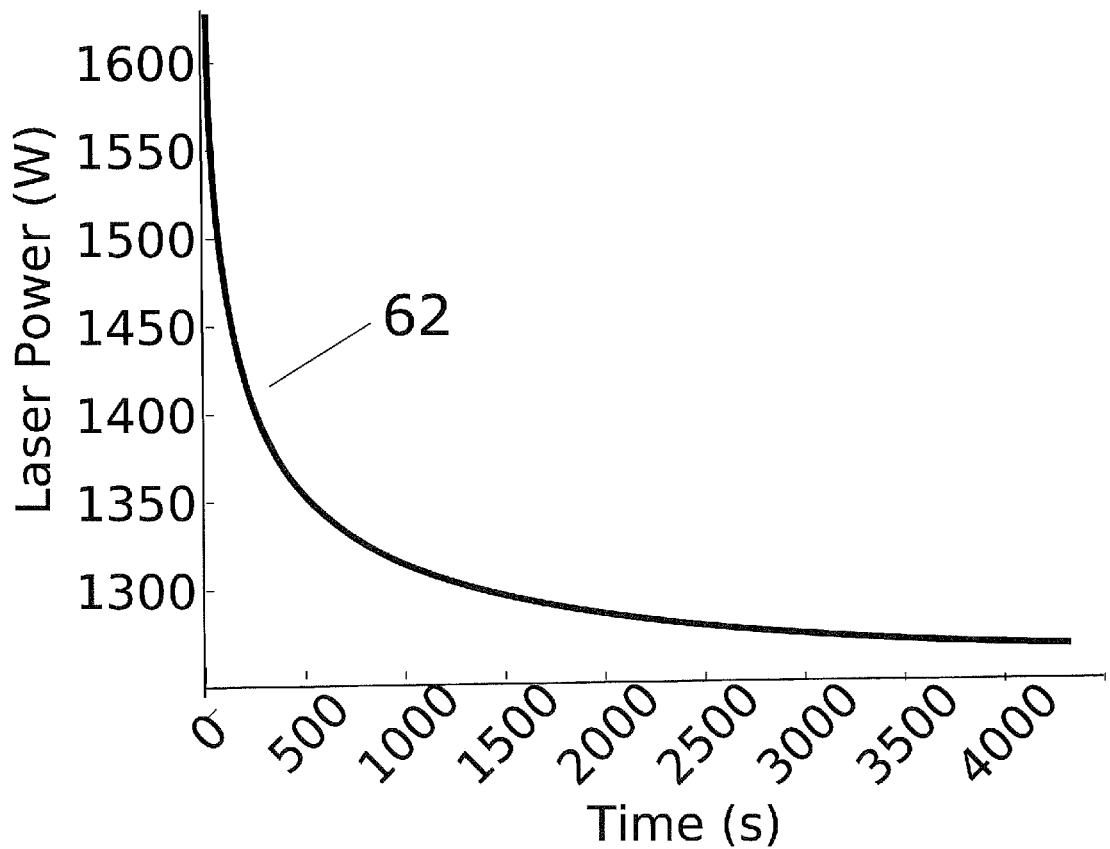
FIG. 10B is a graph showing predicted needed laser power over time for an additive metal deposition process used to build the cylindrical structure of FIG. 10A. The predicted needed laser power is calculated at various intervals along the additive path process according to the present invention calculation technique.

FIGS. 10A and 10B shows the results of the laser power prediction method being applied to a hollow cylinder 61. FIG. 10A depicts a simplified deposition path 60 utilized when building a cylinder structure 61 using additive laser deposition. The predicted power shown in graph 62 of FIG. 10B is very smooth compared to the case described in FIGS. 9A and 9B. This is because the helical path 60 shown in FIG. 10A is much closer to a steady state than the raster path 50 used in the rectangular solid of FIG. 9A. The inventive power prediction method is merely bringing the part up to temperature and settling into a near-steady state.

With the foregoing explanation, it will be appreciated that in one embodiment the inventive method is a power schedule calculation method for an additive deposition process using a beam source that using the decomposition process described above to create a geographic description and build sequence for a part calculates optimum beam power for any point P(s) along an additive path that will be traveled to form the part, the part having a geometry and being formed from deposited material added to a structure, the point P(s) along the additive path having associated with it an idealized geometry comprising a melt pool, hot zone and bulk portion.

Figure 12A:
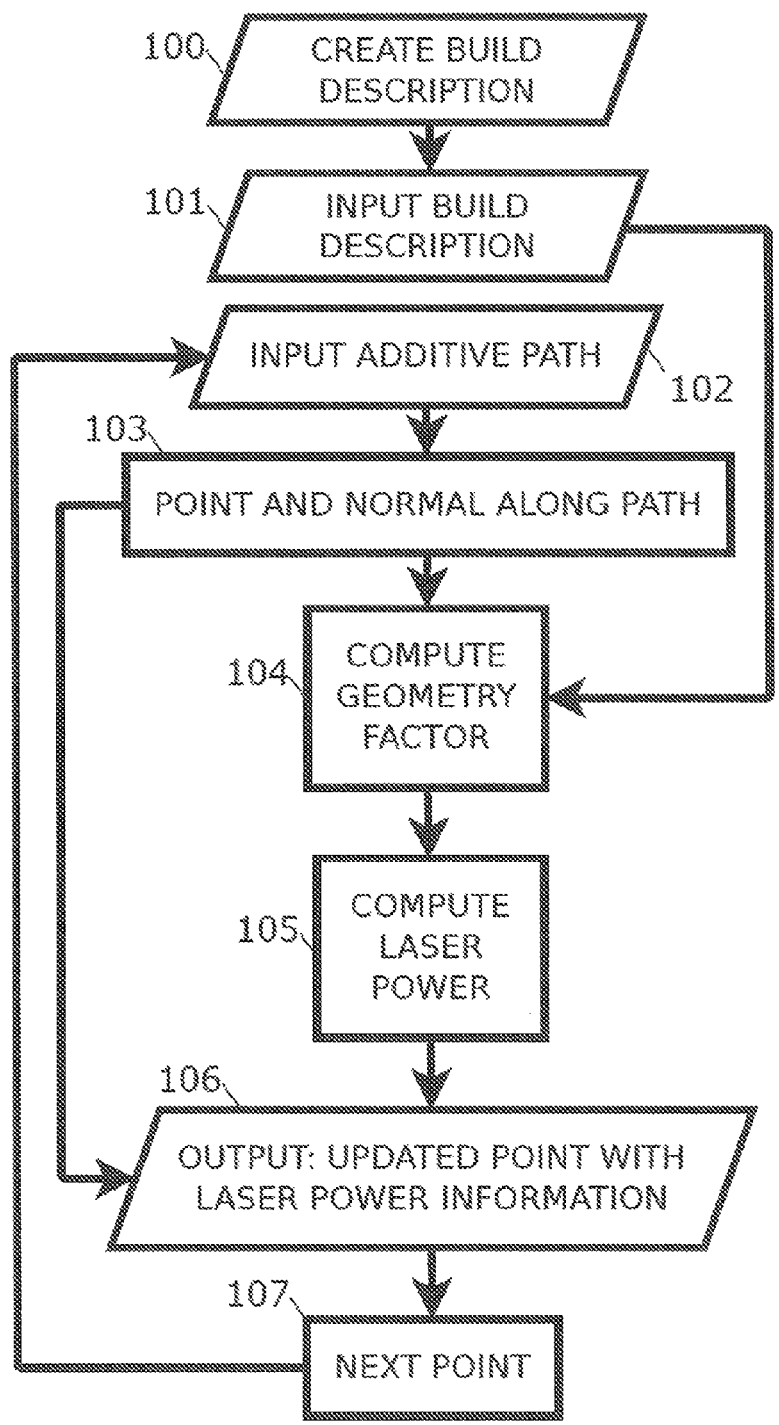
FIGS. 12A-12C are flow charts of an embodiment of the method for controlling beam power according to the present invention predictive technique that uses a build description determined via the decomposition method described herein.
Figure 12B:
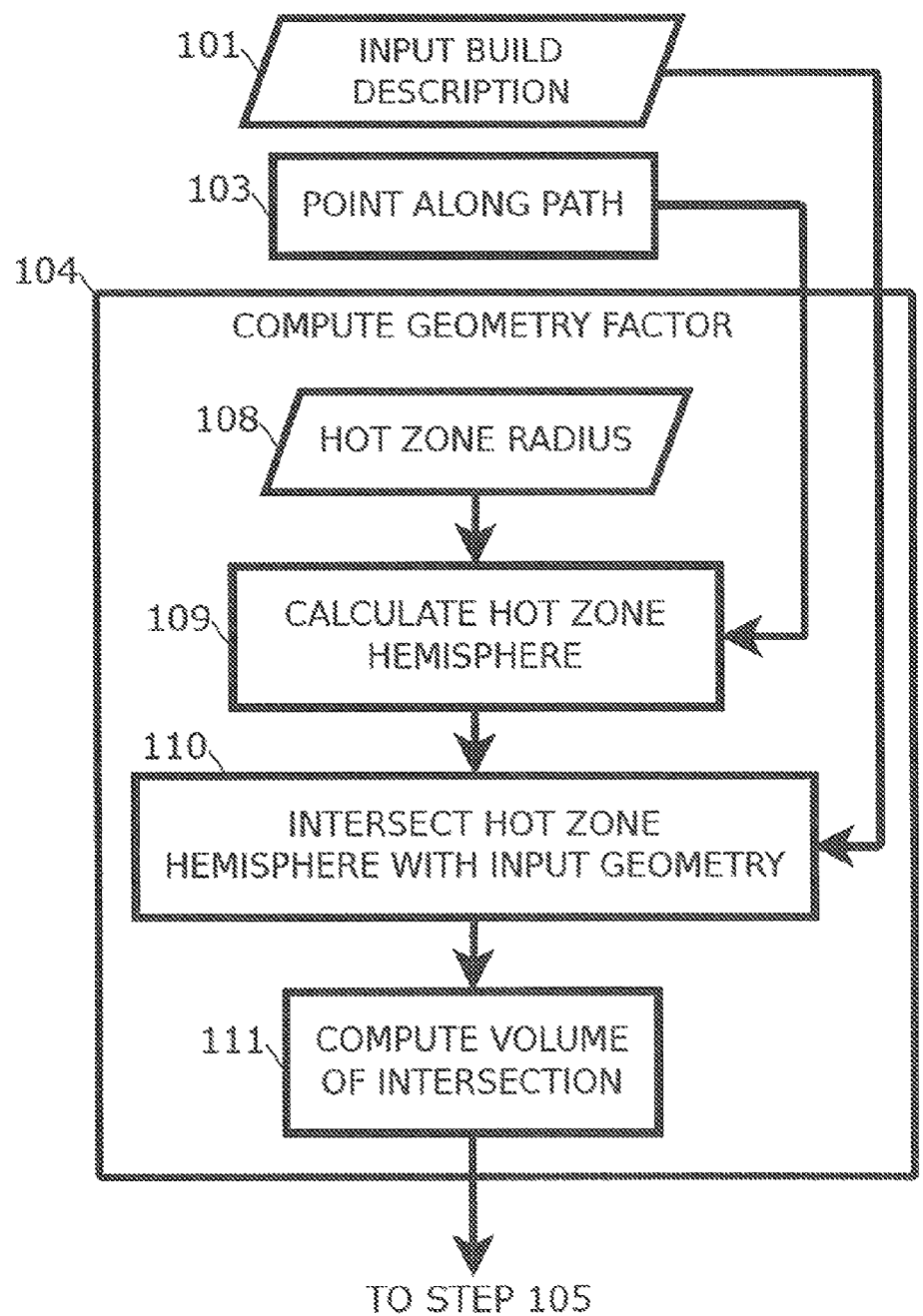
Figure 12C:
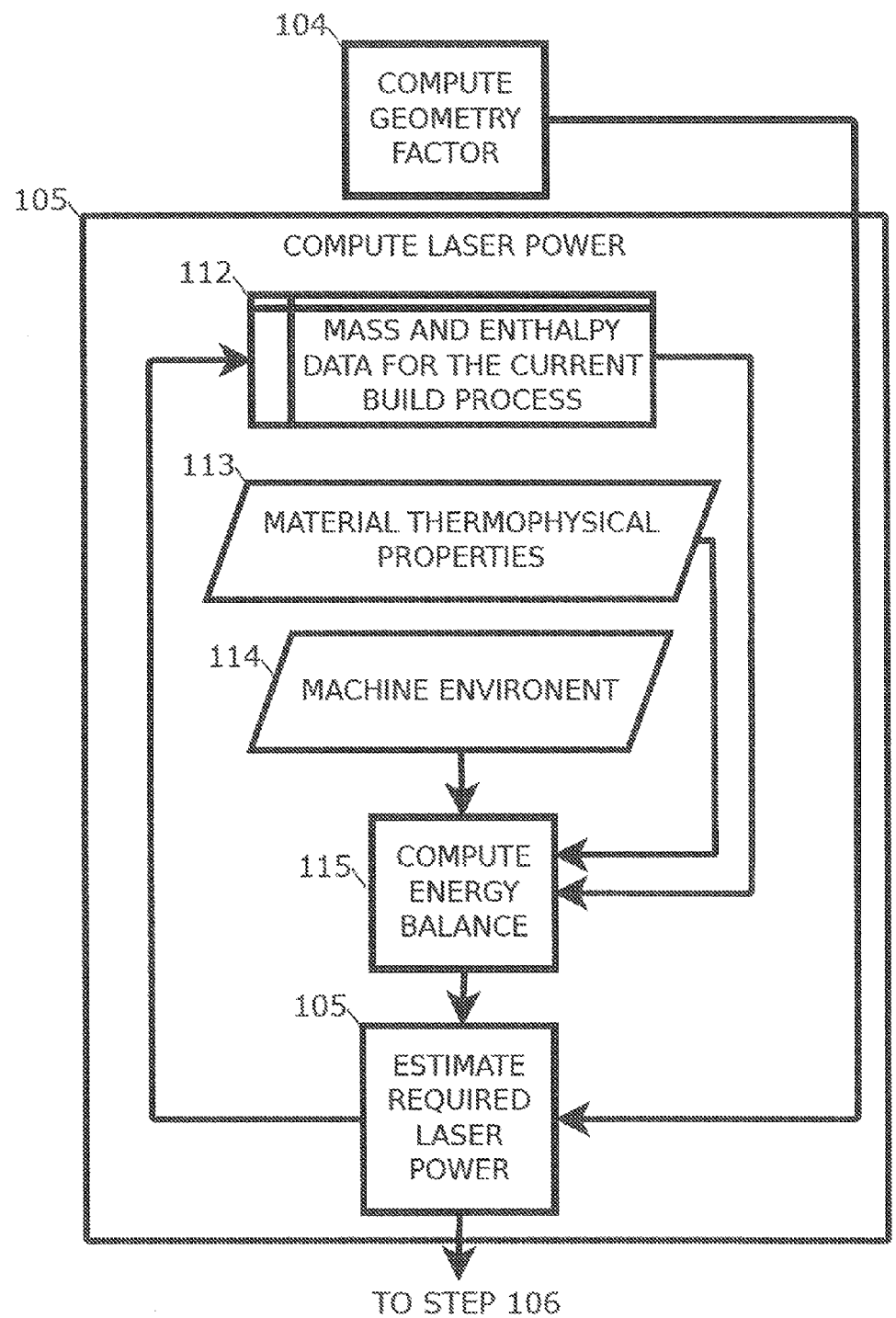

FIGS. 12A-12C are flowchart representations of an embodiment of the present invention method. As shown in FIG. 12A, a first step 100 involves decomposing the part into substructures and creating a build sequence to create the build description. In step 101 that build description is an input to create a geometry factor. A next step 102 includes the input of additive path data also generated by the part of the decomposition process that determines part build sequence. The next stage 103 involves the selection of the point on the path for which power should be predicted. This stage corresponds to equation no. 29 in the above calculations. The next step 104 is computing the geometry factor, which process is explained in more detail in FIG. 12B. At the next stage 105, the required laser power for the particular point on the additive path is determined. This stage 105 is explained in more detail in FIG. 12C. Having computed laser power for the point, the updated point with laser power information is used as an output 106 to control the laser. The process then repeats at step 107 for the next point on the additive path.

As shown in FIG. 12B, the input build description 101 and selected point 103 are used to compute the geometry factor of step 104. This geometry factor is computed according to equations nos. 11-12 in the above equations. In this respect, the selected path point 103 and input as to the hot zone radius 108 is used to calculate a hot zone hemisphere at 109. Calculation 109 is used along with the input build description data 101 to mathematically model an intersection of the hot zone hemisphere on the build at the selected point at step 110. With this model of step 110 the volume of the intersection of the hot zone hemisphere is computed at step 111.

With step 111 completed, the geometry factor computation 104 is completed and the calculation proceeds to compute laser power at step 105. FIG. 12C depicts the step components of the laser power computation step 105. As shown in FIG. 12C an energy balance is computed 115 based upon a preceding computation 112 and data inputs 113, 114. Computation step 112 determines the mass and enthalpy data for the current build process. Step 112 corresponds to equation nos. 20-28 in the above equations. Input 113 relates to material thermophysical properties. Input 114 is the machine environment. The computed energy balance 115 is achieved via equations nos. 13-15 of the above equations. The computed energy balance 115 and the computed geometry factor 104 are then used to estimate required laser power 105 (equations nos. 16-19) at the path point.

Having explained the method mathematically, the inventive method can be verbally summarized and described. In summary description, the method comprises using the decomposition process described above to create a geometric description representing the refined (substructure constituency) geometry and build sequence of the part during the additive process and creating a path description that represents the path of the beam source through space during the additive process. The method further includes calculating the idealized geometry for a point P(s) on the additive path based upon the geometric description and path description. In addition, the method includes calculating an energy balance at the melt pool ($EB_{melt\,pool}$) for the point P(s) on the additive path, the energy balance calculation being based upon the following calculations:

a) a calculation of energy radiated from the melt pool ($H_{rad}$);

b) a calculation of energy conducted from the melt pool to the hot zone ($H_{cond}$), the calculation of $H_{cond}$ being based upon the calculated idealized geometry; and c) a calculation of energy lost due to convection at the melt pool ($H_{conv}$);

The method further includes calculating total energy ($H_{total}$) needed at the point P(s) on the additive path according to the following equation $$H_{total} = H_{deposited\,material} + H_{remelt} + EB_{melt\,pool}$$

wherein $H_{deposited\ material}$ represents energy required to melt the deposited material and $H_{remelt}$ represents energy required to remelt existing material; and The last step of the first embodiment of the inventive method includes calculating optimum beam source power $Q_{source}$ for the point P(s) according to the following equation $$Q_{source} = \min(Q_{max}, H_{total}/\alpha \Delta t)$$

wherein $Q_{max}$ represents maximum laser power, $\alpha$ represents a beam absorption coefficient and $\Delta t$ represents a calculation interval.

The first embodiment inventive method can be refined further by enhancing the calculation of the idealized geometry by calculating a geometry index hot zone volume ($V_{hot}$) for the point P(s) on the additive path according to the formula $$V_{hot} = G \cap Z(r_{hot}, P(s), t'(s))$$

wherein G represents deposition geometry, Z represents a hemisphere of a certain radius (r) and having a circular surface centered at a point P(s) on the additive path with a normal direction (ň), $r_{hot}$ represents the radius of the hot zone and t'(s) represents tool axis direction at a distance s along the additive path; and calculating a geometry index hot zone area ($A_{hot}$) for the point P(s) on the additive path based upon the calculated geometry index hot zone volume ($V_{hot}$) according to the formula $$A_{hot} = V_{hot} A_{max}/V_{max}$$

wherein $A_{max}$ represents the maximum area of the hot zone and $V_{max}$ represents the maximum volume of the hot zone The first embodiment inventive method can be refined further by calculating $EB_{melt\ pool}$ according to the formula $$EB_{melt\ pool} = H_{rad} + H_{cond} + H_{conv}$$

In another embodiment, the invention is directed to a power schedule calculation method for an additive deposition process using a beam source that calculates optimum beam power for any point P(s) along an additive path that will be traveled to form a part, the part having a geometry and being formed from deposited material added to a structure, the point P(s) along the additive path having associated with it an idealized geometry comprising a melt pool, hot zone and bulk portion. This method comprises creating a part geometry description and build sequence using the decomposition technique described herein that will represent the geometry of the part during the additive process and creating a path description based upon data representing the path of the beam source through space during the additive process. The method also involves calculating the mass of the part at a point P(s) during the additive process that accounts for accretion of the part during the additive process and calculating the idealized geometry at point P(s) during the additive process, the idealized geometry calculation calculates the size of the melt pool, hot zone and bulk portion. Additionally, the method involves calculating the temperature of the part at point P(s) during the additive process, the calculation of the temperature of the part includes a calculation of hot zone temperature based upon the idealized geometry.

The second embodiment method further comprises calculating an energy loss of the part at point P(s) during the additive process, the calculation of energy loss being based upon the calculation of temperature and including a calculation of energy conducted from the melt pool to the hot zone; calculating an enthalpy of the part at point P(s) in time during the additive process; calculating total energy needed at the point P(s) based upon the calculated energy loss and enthalpy of the part at point P(s) on the additive path; and calculating an optimum beam source power based upon the calculation of total energy needed.

Figure 11:
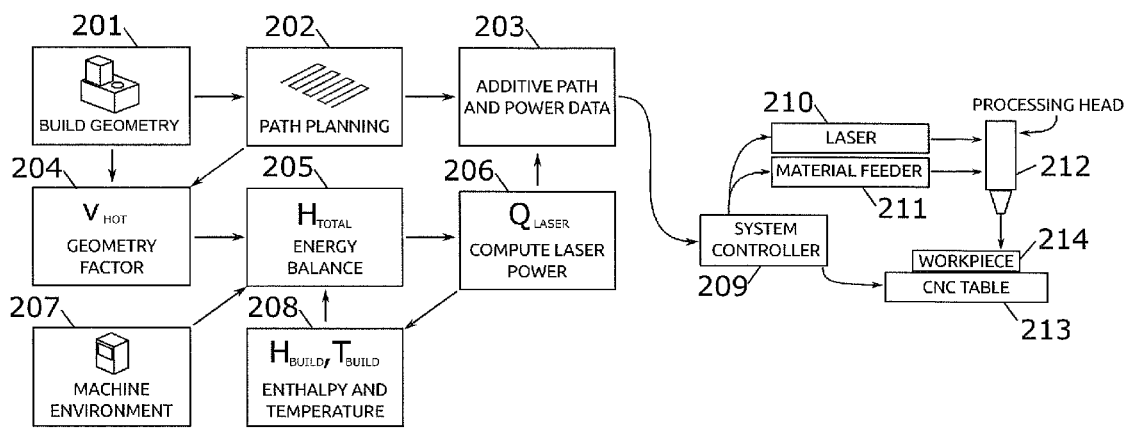
FIG. 11 depicts a preferred embodiment system for fabricating a build (part) on a substrate using a deposition beam source that follows an additive path and that is controlled in accordance with the described laser power prediction method.

Using the calculations above, the laser energy delivered during an additive path deposition process can be controlled for each point along the path by regulating power to the laser at each point in accordance with the required power predicted by the above calculation methods. As such, in another embodiment of the invention the method can be programmed into a computer-controlled laser metal deposition system to improve the fabrication of component of almost any geometry or build description that can be produced from a computer database. This system for fabricating a part on a substrate using a deposition beam source that follows an additive path is depicted in FIG. 11. The system includes a computer-aided design database including a build description and build sequence of the part to be fabricated created by the decomposition process described herein and a database describing the additive path to be traveled as the part is formed. The additive path is composed of a plurality of points. The system further includes a substrate support (CNC table) 213 for supporting the workpiece (substrate) 214 and manipulating it through space, a material feeder 211 (a metal stock delivery system such as a powdered metal injector/sprayer or wire feeder) and a laser 210, a system controller 209 and a processing head 212. Laser 210, system controller 209 and processing head 212 work together to emit a beam (arrow impacting workpiece) onto workpiece 214 and form a melt pool thereon and control power to the beam source. System controller 209 is programmed to regulate energy of the produced beam for any point on the additive path in accordance with the required power predicted by the above calculation methods. System controller 209 regulates power to laser 210 for each point on the additive path as a function of input data shown in FIG. 11. These inputs are used to produce an overall additive path and power data input 203 for the system controller. The additive path component of this input is based upon the build description of the workpiece to be built 201 and a description of the planned path to be followed during the laser deposition process 202. Data elements 201 and 202 are also used to compute a predicted required power level and are used as inputs to compute a hot zone volume geometry factor 204 for the point on the path. Data 204 is an input along with machine environment data 207 and enthalpy and temperature data 208 that is used to compute energy balance 205 calculated for the point during the process. Element 205 is used to compute needed laser power 206. As the deposition process is additive and the formula recursive, computed laser power 206 is also a data element that factors into enthalpy and temperature data 208.

The process described herein can also be used in connection with other traditional welding techniques, such as tungsten inert gas ("TIG") welding, gas metal arc welding ("GMAW"), plasma transferred arc ("PTA") welding and electron beam ("EB") welding. While the embodiments of the method and system of the present invention have been described herein, numerous modifications, alterations and changes to the described embodiments are possible without departing from the scope of the invention. The embodiments described herein are not intended to be limiting.

What is claimed is:

1. A method for building a part having an overall geometry by way of an additive layering process, the method comprising:
   a) creating a refined geometric description of the part by decomposing the overall geometry of the part by:
      1) identifying a first substructure of the part, the first substructure having a first starting surface and a first interrogation interval, the first starting surface representing a surface at which additive layering of the first substructure can begin and the first interrogation interval being defined by a first overhang angle $\theta_1$ and a first interval height $\delta_1$;
      2) virtually decomposing the first substructure by starting from the first starting surface and sequentially subtracting layers equal to the first interrogation interval from the first substructure until the first substructure is removed and only a second portion of the part remains;
      3) identifying a second substructure of the second portion of the part, the second substructure having a second starting surface and a second interrogation interval, the second starting surface representing a surface contiguous with the first substructure and at which additive layering of the second substructure can begin once the first substructure is additively manufactured and the second interrogation interval being defined by a second overhang angle $\theta_2$ and a second interval height $\delta_2$;
      4) virtually decomposing the second substructure by starting from the second starting surface and sequentially subtracting layers equal to the second interrogation interval from the second substructure until the second substructure is removed;
      5) continuing the process described in steps 3) and 4) for so long as any portion of the part remains, the starting surface for a later identified substructure representing a surface contiguous with a previously decomposed substructure and at which additive layering of that later identified substructure can begin once the previously decomposed substructure is additively manufactured;
   b) determining a sequence for building by additive layering all of the substructures identified in steps a)1) through a)5); and
   c) building the part by building by additive layering each substructure of the part in the sequence determined in step b).

2. A method of modulating beam power during an additive deposition process employing a beam source at a point P(s) along an additive path that will be traveled to form a part during the additive deposition process, the method comprising:
   a) creating a build description for the part by:
      1) identifying a first substructure of the part, the first substructure having a first starting surface and a first interrogation interval, the first starting surface representing a surface at which additive layering of the first substructure can begin and the first interrogation interval being defined by a first overhang angle $\theta_1$ and a first interval height $\delta_1$;
      2) virtually decomposing the first substructure by starting from the first starting surface and sequentially subtracting layers equal to the first interrogation interval from the first substructure until the first substructure is removed and only a second portion of the part remains;
      3) identifying a second substructure of the second portion of the part, the second substructure having a second starting surface and a second interrogation interval, the second starting surface representing a surface at which additive layering of the second substructure can begin once the first substructure is additively manufactured and the second interrogation interval being defined by a second overhang angle $\theta_2$ and a second interval height $\delta_2$;
      4) virtually decomposing the second substructure by starting from the second starting surface and sequentially subtracting layers equal to the second interrogation interval from the second substructure until the second substructure is removed;
      5) continuing the process described in steps 3) and 4) for so long as any portion of the part remains, the starting surface for a later identified substructure representing a surface contiguous with a previously decomposed substructure and at which additive layering of the later identified substructure can begin once the previously decomposed substructure is additively manufactured; and
      6) determining a sequence for building by additive layering all of the substructures identified in steps a)1) through a)5);
   b) creating a path description based upon the build description that represents the path of the beam source through space during the additive process;
   c) calculating the mass of the part at a point P(s) during the additive process based upon the build description; and
   d) modulating the power of the beam emitted by the beam source at the point P(s) of the additive path based upon the mass of the part at the point P(s) during the additive process.

3. A system for fabricating a part on a substrate using a deposition beam source that emits a beam that follows an additive path composed of a plurality of points, the system comprising:
   a substrate support for supporting the substrate and manipulating it through space;
   a metal stock delivery system;
   a controllable beam source capable of emitting a beam onto the substrate and adapted to form a melt pool thereon; and
   a database for storing a build description of the part, the build description comprising:
   a first identified substructure of the part and one or more additional identified substructures of the part, with each additional identified substructure being contiguous with at least one other substructure of the part; and a build sequence for the part that sets forth a sequence of building by additive layering each of the identified substructures; and
   a controller adapted to control power to the beam source, the controller programmed to receive as an input the build description and regulate energy of the produced beam for any point on the additive path based upon the build description.

4. A system for fabricating a part on a substrate using a deposition beam source that emits a beam that follows an additive path composed of a plurality of points, the system comprising:
   a substrate support for supporting the substrate and manipulating it through space;
   a metal stock delivery system;

a controllable beam source capable of emitting a beam onto the substrate and adapted to form a melt pool thereon; and a controller configured to modulate the power of the beam emitted by the beam source at a point P(s) of the additive path in accordance with the method of claim 2.

* * * * *